United States Patent
Tomikawa et al.

(10) Patent No.: US 9,344,582 B2
(45) Date of Patent: May 17, 2016

(54) TERMINAL AND MOBILE COMMUNICATION SYSTEM

(71) Applicant: FUJITSU LIMITED, Kawasaki-shi, Kanagawa (JP)

(72) Inventors: Tadato Tomikawa, Sapporo (JP); Takayoshi Ode, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 62 days.

(21) Appl. No.: 14/274,393

(22) Filed: May 9, 2014

(65) Prior Publication Data

US 2014/0364084 A1  Dec. 11, 2014

(30) Foreign Application Priority Data

Jun. 7, 2013 (JP) ................................. 2013-121180

(51) Int. Cl.
| | |
|---|---|
| H04M 11/00 | (2006.01) |
| H04M 15/00 | (2006.01) |
| H04W 4/24 | (2009.01) |

(52) U.S. Cl.
CPC .............. *H04M 15/67* (2013.01); *H04M 15/09* (2013.01); *H04M 15/43* (2013.01); *H04M 15/44* (2013.01); *H04M 15/75* (2013.01); *H04M 15/755* (2013.01); *H04M 15/7553* (2013.01); *H04W 4/24* (2013.01)

(58) Field of Classification Search
CPC .... H04W 4/24; H04M 2215/32; H04M 15/00
USPC ............ 455/408, 407, 406, 414.1, 418, 41.1, 455/41.2
See application file for complete search history.

(56) References Cited

U.S. PATENT DOCUMENTS

| | | | | |
|---|---|---|---|---|
| 2001/0056467 | A1* | 12/2001 | Wilkinson | .............. G06Q 30/02 709/204 |
| 2015/0006343 | A1* | 1/2015 | Sako | .................... B60L 11/1816 705/34 |

FOREIGN PATENT DOCUMENTS

| | | |
|---|---|---|
| JP | 04-342324 A | 11/1992 |
| JP | 2003-061136 A | 2/2003 |
| JP | 2004-133848 A | 4/2004 |

* cited by examiner

*Primary Examiner* — Nghi H Ly
(74) *Attorney, Agent, or Firm* — Arent Fox LLP

(57) ABSTRACT

A terminal configured to perform communication using a base station, includes a communication device that acquires billing information stored on an external storage device via a radio communication link with the external storage device, and a controller that performs a transmission operation to transmit the billing information acquired from the external storage device to a billing device, the billing device being connected to the base station via a network, storing original billing information for use in billing related to the communication that the terminal performs using the base station and temporarily switching from the original billing information to the received billing information when the billing information is received from the external storage device.

23 Claims, 19 Drawing Sheets

FIG. 15

| CARD NUMBER | TELEPHONE NUMBER | NW PASSWORD |
|---|---|---|
| aaaaaa | 090-xxxx-yyyy | eeeeeeee |
| bbbbbb | 090-yyyy-zzzz | ffffffff |
| ... | ... | ... |
| ... | ... | ... |

FIG. 19

| CARD NUMBER | TELEPHONE NUMBER | NW PASSWORD | E-MAIL ADDRESS |
|---|---|---|---|
| aaaaaa | 090-xxxx-yyyy | eeeeeeee | ee@ggg.com |
| bbbbbb | 090-yyyy-zzzz | ffffffff | ff@ggg.com |
| ... | ... | ... | ... |
| ... | ... | ... | ... |

TERMINAL AND MOBILE COMMUNICATION SYSTEM

CROSS-REFERENCE TO RELATED APPLICATION

This application is based upon and claims the benefit of priority of the prior Japanese Patent Application No. 2013-121180, filed on Jun. 7, 2013, the entire contents of which are incorporated herein by reference.

FIELD

The embodiments discussed herein are related to a terminal and a mobile communication system.

BACKGROUND

In the mobile communication system, a holder (user) of a terminal device (also called a "mobile terminal" or a "radio terminal", hereinafter referred to as a "terminal") pays a communication operator who provides communication service a fee (usage charge) to receive communication service including voice communication and data communication using the terminal. For example, a method of determining a fee based on an amount of information related to a communication service (communication traffic) is referred to a usage based fee.

Usage fee payment methods include a prepaid method that allows a user to use communication service within a fee range of a prepaid fee, a method of a bank account payment that allows a user to pay a usage fee through a bank account, and a card settlement method that allows a user to pay a usage fee through a credit card issued by a credit card company.

When the bank account transfer or the credit card payment is used, the user in advance applies to the operator for a bank account number and a credit card number of a credit card. The bank account number and the card number are registered as information according to which a usage fee is billed. The registration of a plurality of bank accounts or a plurality of card numbers is not ordinarily performed. More specifically, each terminal is associated with a particular bank account number or a particular card number.

It is now contemplated in the mobile communication system that a person other than the right user may use the terminal of the right user. For example, there are times when a person holds no terminal or when a person holds a terminal but currently does not carry it.

In such a case, a public telephone may be used. However, as the mobile communication system is in widespread use, the number of available public telephones decreases. This presents a difficulty in the use of public telephones. A person may temporarily borrow a terminal of another person and use it. In such a case, a fee (including one for a telephone communication and a data communication) is billed to the holder of the terminal. The user pays the holder of the terminal the fee in any way.

Techniques related to terminal borrowing are described below. For example, a person having a personal telephone number may communicate using a borrowed mobile telephone terminal. A number reading circuit reads a credit card number and sends the credit card number to a line controller. The line controller sends a personal telephone number corresponding to the credit card number to the borrowed mobile telephone terminal. The terminal writes the received personal telephone number on a personal telephone number memory therewithin, thereby changing the personal telephone number (as described in Japanese Laid-open Patent Publication No. 4-342324).

It is difficult and complex to calculate a fee incurred in the borrowing and pay the terminal holder the fee. In the related art described in Japanese Laid-open Patent Publication No. 4-342324, the telephone number of the borrowed mobile terminal is changed to the personal telephone number of the borrower so that the borrowed telephone terminal is set to be identical in state to a terminal held by the user of the borrowed mobile telephone terminal. In this way, the problem related to the billing is solved.

However, the related art suffers from the following problem. Firstly, the related art assumes that the borrower has a personal telephone number. A person having no personal telephone number has difficulty in using the borrowed mobile telephone terminal.

Secondly, in accordance with the related art, the personal telephone number is sent to the borrowed mobile telephone terminal, and the borrowed mobile telephone terminal is changed to have the personal telephone number. The borrowed mobile telephone terminal is thus usable. In current standard specifications of terminals, the terminal includes a subscriber identity module (SIM) card storing a telephone number and a unique identification (ID) identifying the telephone number, and the unique ID is solidly associated with the telephone number. A physical structure (a terminal structure, for example) of an IC card used as a SIM card is not formed on the assumption that the stored telephone number is changed. For this reason, the change of the telephone number is difficult to contemplate.

SUMMARY

According to an aspect of the embodiments, a terminal configured to perform communication using a base station, includes a communication device that acquires billing information stored on an external storage device via a radio communication link with the external storage device, and a controller that performs a transmission operation to transmit the billing information acquired from the external storage device to a billing device, the billing device being connected to the base station via a network, storing original billing information for use in billing related to the communication that the terminal performs using the base station and temporarily switching from the original billing information to the received billing information when the billing information is received from the external storage device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 15 illustrates an example of a database;

FIG. 19 illustrates an example of a database for use in the tenth operation example.

DESCRIPTION OF EMBODIMENTS

Embodiments are described with reference to the drawings. The embodiments are described for exemplary purposes only, and are not limited to those described herein.

First Embodiment

System configuration

Figure 1:
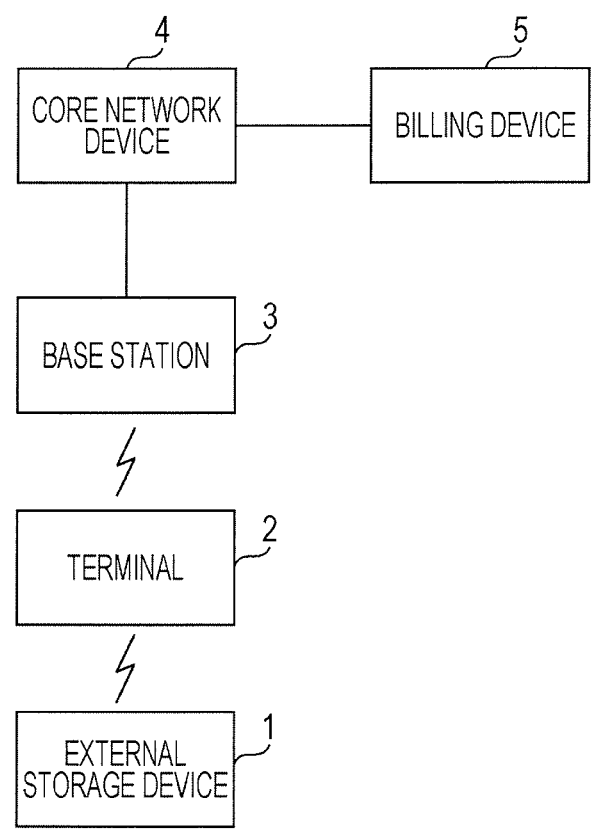
FIG. 1 is an example of a configuration of a mobile communication system.

FIG. 1 illustrates a system configuration of a mobile communication system. As illustrated in FIG. 1, the mobile communication system includes an external storage device 1, a terminal 2, a base station 3 in radio communication with the terminal 2, a higher layer device (core network device) 4 connected to the base station 3, and a billing device (billing controller) 5 connected to the core network device 4 via a network.

The external storage device 1, having a radio communication function to communicate with the terminal 2, radio communicates with the terminal 2. The external storage device 1 includes a radio communication unit (not illustrated) and a storage unit (not illustrated). The storage unit stores information (billing information) that is to be transmitted to the terminal 2 for a billing operation when a holder of the external storage device 1 borrows the terminal 2 of another person.

A card or a device, each including an integrated circuit (IC) chip, is used for the external storage device 1. The IC chips may be an IC card or a contactless IC card. The IC card includes a terminal that complies with one of a variety of standards including ISO7816. The contactless IC card complies with one of a variety of standards including ISO10536, ISO14443, and ISO15693. The contactless IC card includes radio frequency identification (RFID or RF tag).

The IC chip complies with near field communication (NFC) standards for near field communications. Communication methods complying NFC include "Felica" (registered trademark). Boarding cards and/or digital money, based on Felica (registered trademark) include super urban intelligent card "Suica" (registered trademark) or "Edy" (registered trademark).

The external storage device 1 may transmit at least billing information to the terminal 2 via a radio communication based on contactless communication standards or near field communication standards related to the IC chip. The external storage device 1 may be a terminal complying with another near field communication standard, such as a Bluetooth terminal that performs a Bluetooth (registered trademark) communication with the terminal 2.

The billing information identifies a billing target of the billing device 5, namely, a billing address of a variety of fees including a usage fee of a communication service for use of the mobile communication system. The billing information may be a credit card number or a bank account number that the holder of the terminal 2 uses to pay the fee for the communication service.

A credit card with an IC chip is described below as an example of the external storage device 1. The IC chip has a near field communication function complying with Felica (registered trademark) and includes a storage device that stores a credit card number as an example of the billing information. In the discussion that follows, the credit card with the IC chip is also referred to as an "external IC chip".

The terminal 2 performs radio communications in accordance with a variety of communication standards of mobile phones (cellular phones or smart phones, for example), including 3rd generation partnership project (3GPP), long term evolution (LTE), or LTE-Advance. The terminal 2 may thus use communication services by the mobile communication system. Besides the communication standards for the cellular phone, the terminal 2 may be radio local area network (LAN) terminal (such as tablet terminal) that performs a wireless LAN communication complying with a variety of LAN standards.

The terminal 2 includes a radio communication circuit (hereinafter referred to as communication circuit) to perform a radio communication with the external storage device 1. The terminal 2 transmits the billing information received from the external storage device 1 to the core network device 4 via the base station 3. The radio communication circuit is an example of a communication device.

The core network device 4 corresponds to a higher layer device of the base station 3, and performs a variety of operations to provide the terminal 2 with the communication service. For example, the core network device 4 functions as a line controller that performs a call communication operation (connection and disconnection operation) of communications (voice communication and data communication) with the terminal 2, and a connection operation to be performed between a core network and an external network (a variety of IP networks including the Internet and intranet). The core network device 4 is an example of a network device.

The core network device 4 transfers the billing information received from the terminal 2 via the base station 3 to the billing device 5. The core network device 4 may be a device that implements the above-described function or a set of devices included in the core network.

The billing device 5 is connected to the core network device 4 via a communication line. The billing device 5 may include a billing server or a device forming a public line, such as switching equipment in the public line.

The billing device 5 stores identity information (terminal ID) of each terminal which uses the mobile communication system, and the billing information related to each terminal (for use in settlement). The terminal ID is a telephone number, for example. The terminal ID may be information that uniquely identifies the terminal 2. The billing information includes a credit card number or a bank account number. The billing device 5 stores, as (original) billing information, the billing information registered by the holder of the terminal 2 and the terminal ID in association with each other.

The billing device 5 receives a value (referred to as a billing amount) that is counted by the core network device 4 and is used to calculate a fee related to the communication service provided to the terminal 2. The billing device 5 then calculates the fee responsive to the value. The value (the billing amount) may be a duration of call and the number of packets.

The billing device 5 performs a billing operation on the terminal 2 using the billing information associated with the terminal 2. Upon receiving the terminal ID of the terminal 2 (telephone number) and the value for fee calculation (referred to as "billing amount"), the billing device 5 performs the billing operation in accordance with the billing information based on the telephone number. More specifically, the billing device 5 associates the billing information with the billing amount. The sum of billing amounts associated with the billing information during a specific period of time is settled using the billing information (the bank account number or the card number).

Upon receiving the billing information stored on the external storage device 1 from the core network device 4, the billing device 5 temporarily switches from the original billing information (hereinafter referred to as "billing information (1)") to the billing information (hereinafter referred to as "billing information (2)") stored on the external storage device 1. In other words, the billing device 5 uses the billing information (2) as information to be used in the billing of the communication fee for use of the terminal 2. In this way, the fee for the use of the communication service by the terminal 2 is thus billed in accordance with the activated billing information (2).

This is interpreted to mean that the billing target (billing address) is switched from the holder (user) of the terminal 2 to the borrower of the terminal 2, namely, the user of the external storage device 1. In other words, if the user of the external storage device 1 borrows the terminal 2 of another person, the fee for borrowing the terminal 2 is billed to the borrower in accordance with the billing information (2). The billing fee is then paid by the credit card company or withdrawn from the bank account. In accordance with the embodiment, the switching of the billing information using the external storage device 1 automatically collects from the borrower the fee for the use of the terminal 2.

The "holder (user) of the terminal 2" includes a person who is responsible for paying the billing fee occurring for the use of the terminal 2 (a person having the original billing information initially registered on the billing device 5), and for example, may be a person who exclusively owns the terminal 2 or who manages the terminal 2. The "user of the external storage device 1" includes a person who is responsive for paying the billing fee based on the billing information stored on the external storage device 1, and, for example, may be a person who owns the external storage device 1, who exclusively owns the external storage device 1 or who holds the external storage device 1.

Operation Example of System

Figure 2:
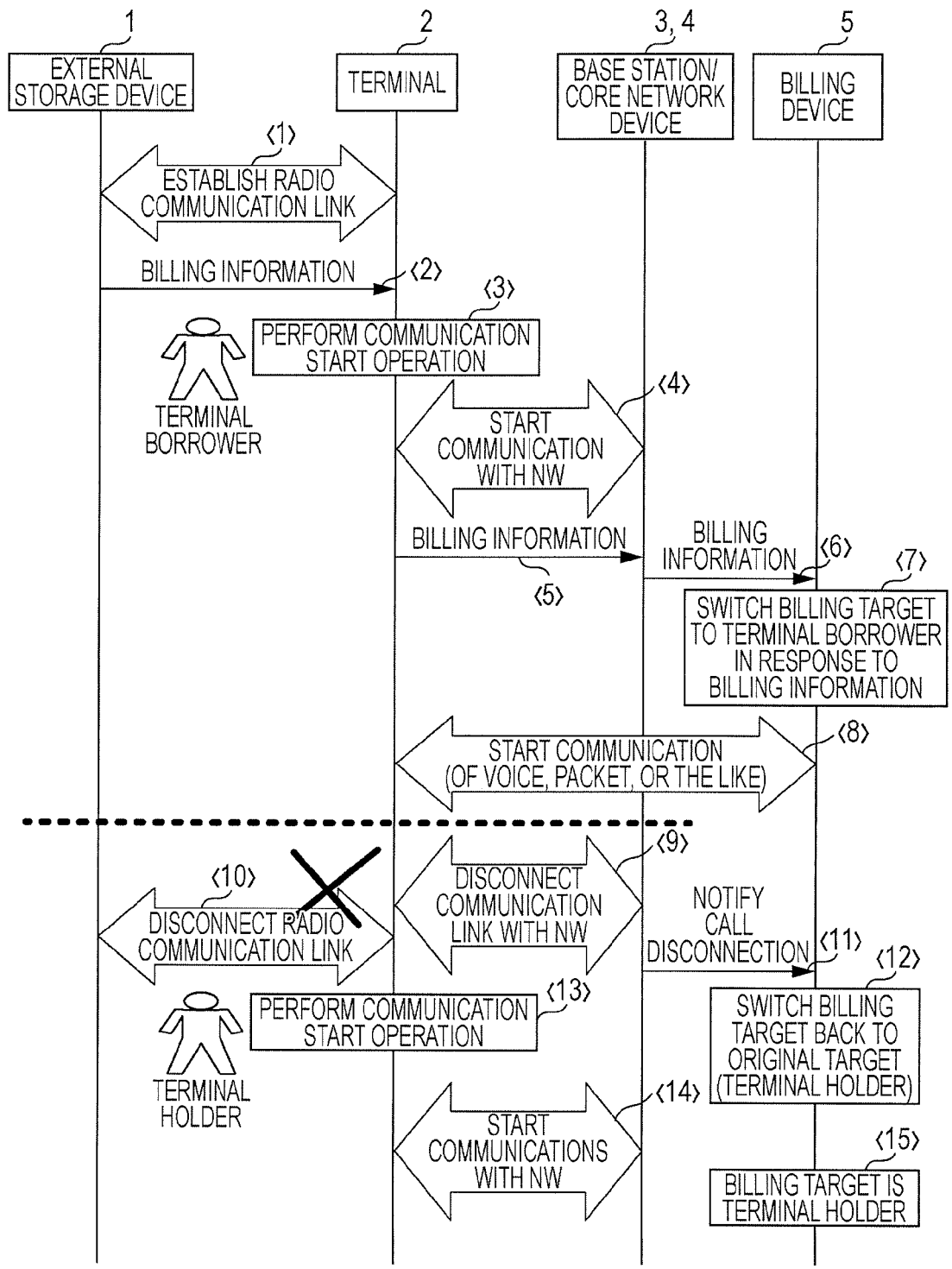
FIG. 2 illustrates a sequence chart illustrating an operation example (of a billing method) of a first embodiment.

FIG. 2 illustrates a sequence chart illustrating an operation example (of a billing method) of a first embodiment. FIG. 2 is based on the assumption that a borrower A having the external storage device 1 temporarily borrows the terminal 2 from a holder B of the terminal 2 to use the communication service.

The borrower A establishes a radio communication link between the external storage device 1 and the terminal 2 by placing the external storage device 1 close to or in contact with the terminal 2 (<1> in FIG. 2). The billing information (2) stored on the external storage device 1 is then transmitted to the terminal 2 (<2> in FIG. 2). The billing information (2) functions to identify the external storage device 1 (identity information). For example, if the external storage device 1 is a credit card, the credit card number as the billing information (2) functions as identity information of the credit card.

The borrower A performs an operation to start communications (voice communication or data communication) with the terminal 2 (<3> in FIG. 2). A connection procedure of communication using the base station 3 is performed between the terminal 2 and the core network device 4. The terminal 2 starts communication with a network (NW) (<4> in FIG. 2).

The terminal 2 transmits the billing information (2) to the core network device 4 via the base station 3 (<5> in FIG. 2). The core network device 4 transmits the billing information (2) to the billing device 5 (<6> in FIG. 2). The billing device 5 switches from original billing information corresponding to the terminal 2 pre-stored on a storage unit in the billing device 5 (the billing information (1) of the holder B) to the billing information (2) of the borrower A received from the core network device 4 (<7> in FIG. 2).

The terminal 2 starts communication with a communication partner connected thereto via the core network device 4 (<8> in FIG. 2). Information indicating a billing amount for the communication is transmitted from the core network device 4 to the billing device 5. The billing device 5 performs a billing operation based on the billing information (2) of the borrower A associated with the terminal 2.

When the borrower A disconnects the communication, a disconnection procedure is performed between the terminal 2 and the core network device 4 (<9> in FIG. 2). The disconnection of the communication disconnects a radio communication link between the terminal 2 and the external storage device 1 (<10> in FIG. 2).

During the disconnection procedure, the core network device 4 transmits a disconnection notification to the billing device 5 (<11> in FIG. 2). The billing device 5 then switches from the billing information (2) associated with the terminal 2 to the billing information (1) of the holder B (thus applies the billing information (1)). The billing device 5 thus reverts back to the billing information (1) (<12> in FIG. 2).

The holder B having the terminal 2 returned by the borrower A performs a communication start operation (<13> in FIG. 2). When communication with the network starts, the billing device 5 bills the holder B the fee for the communication in accordance with the billing information (1) of the holder B (<15> in FIG. 2).

Operation and Advantage of First Embodiment

In accordance with the first embodiment, the use of the external storage device 1 allows the fee for the communication for the use of the terminal 2 by the borrower A and the fee for the communication for the user of the terminal 2 by the holder B to be separately billed.

It is contemplated in the related art technique that the communication fee of the borrower A is settled based on the monthly communication fee of the terminal using the card statement or the billing statement of the original billing destination of the terminal 2 (the bank account or the credit card of the holder B).

If settlement is performed based on the billing statement or the card statement, typically issued on a monthly basis (or every several months), it is difficult to complete the settlement until the holder B has received the billing statement or the card statement. Since detailed usage is not known from a mere billing statement for the communication, the fee incurred in the use of the terminal 2 by the borrower A is difficult to identify.

Some terminals have a function of calculating and outputting the rough estimate of the communication fee, but do not calculate an accurate communication fee. Since an actual communication fee is not known, the borrower A may possibly become nervous about using the terminal 2.

In accordance with the first embodiment, the billing target (billing address) is temporarily changed to the borrower A during the lending (borrowing) of the terminal 2. In this way, the billing to the billing address specified by the borrower A is enabled, and the communication fee settlement procedure between the borrower A and the holder (lender) B is thus omitted. The borrower A may be at ease with using the terminal 2.

In accordance with the first embodiment, the method of notifying the information for billing (the billing information) from the terminal 2 to the billing device (billing controller) 5 is set to be different depending on the communication state between the terminal 2 and the base station 3.

Voice/data communication may be still to be established after a radio communication link is established between the external storage device 1 and the terminal 2. The billing information stored on the external storage device 1 may be notified to the network side when the voice/data communication is established using control information (C-Plane (Control-Plane)) in 3GPP. In contrast, if the voice/data communication is performed, packet data including the billing information from the external storage device 1 is transmitted. In this way, the billing address is switched.

If a switching function is not available to switch from the billing information (2) back to the billing information (1) once the billing information is switched from the billing information (1) to the billing information (2), there is a possibility that the fee for the use of the terminal 2 by the holder B is billed to the borrower A.

As illustrated in FIG. 2, the billing device 5 switches from the billing information (2) to the original billing information (1) when the communication of the terminal 2 using the base station 3 is disconnected. In this way, the usage fee of the terminal 2 by the holder B is not billed to the borrower A after the terminal 2 is returned to the holder B.

Second Embodiment

The mobile communication system of FIG. 1 is described in detail as a second embodiment.

Configuration of Terminal

Figure 3:
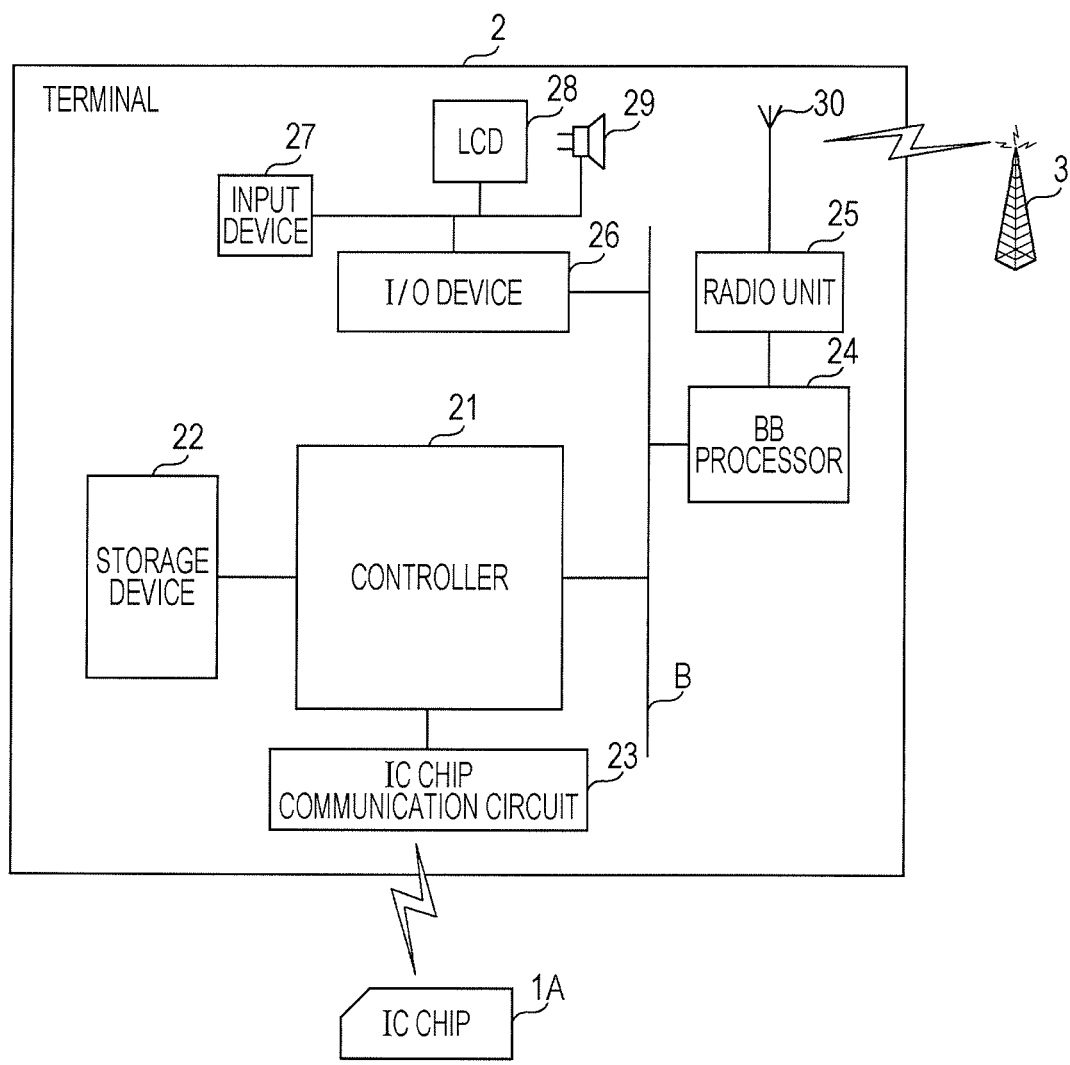
FIG. 3 illustrates a configuration of a terminal.

FIG. 3 illustrates a configuration of the terminal 2. The terminal 2 includes a controller 21, a storage device 22 connected to the controller 21, and an IC chip communication circuit 23 connected to the storage device 22. The controller 21 is connected to a baseband (BB) processor 24 and an input/output (I/O) device 26 via a bus (internal transfer line) B. The BB processor 24 is connected to a radio unit 25, which in turn is connected to an antenna 30. The I/O device 26 is connected to an input device 27, a liquid-crystal display (LCD) 28, and a speaker 29.

The storage device 22 includes a main memory to be used as a working area for the controller 21. The main memory includes a random-access memory (RAM) and a read-only memory (ROM). The storage device 22 includes an auxiliary storage device. The auxiliary storage device stores a variety of programs to be performed by the controller 21 and data to be used when each program is executed. For example, the auxiliary storage device is a non-volatile recording medium and includes at least one of a hard disk, a flash memory, and an electronically erasable programmable read-only memory (EEPROM). The storage device 22 is an example of the recording media.

The IC chip communication circuit 23 communicates with an external IC chip 1A (such as a card including an IC chip) as an example of the external storage device 1 in accordance with a radio communication scheme implemented on the external IC chip. The IC chip communication circuit 23 may thus exchange data with the external IC chip 1A. The IC chip communication circuit 23 is an example of a communication circuit that performs radio communications with the external storage device 1, and implements a radio communication scheme implemented on the external storage device 1. If the external storage device 1 is a Bluetooth (registered trademark) terminal, a communication circuit complying with Bluetooth communications is included.

The controller 21 is an example of a processor, and includes a central processing unit (CPU) or a digital signal processor (DSP). By executing a variety of programs stored on the storage device 22, the controller 21 performs a connection operation and a disconnection operation between the terminal 2 and the network (a communication partner), and an operation to transmit to the network the billing information acquired from the external IC chip 1A. By executing a variety of application programs, the controller 21 may implement a function responsive to the purpose of each application. For example, the controller 21 has a mailer function to perform an operation related to a short mail or an e-mail, and a web browsing function.

The input device 27 receives information (data) input to the terminal 2 by the user, and transfers the information to the controller 21 via the I/O device 26. The input device 27 includes, besides a button and a key, a microphone to input audio. The LCD 28 displays information in response to the information (data) received from the controller 21 via the I/O device 26. The speaker 29 outputs audio under the control of the controller 21. The LCD 28 and the speaker 29 are examples of an output device.

The BB processor 24 performs an encoding operation and a modulation operation on data received from the controller 21, thereby generating a baseband signal. The BB processor 24 also performs a demodulation operation and a decoding operation on a baseband signal received from the radio unit 25 and transfers the resulting data to the controller 21. The BB processor 24 may include a DSP, or a combination of the DSP and a programmable device (PLD, such as a field programmable gate array (FPGA)).

The radio unit 25 digital-to-analog converts the baseband signal from the BB processor 24, thereby performing an up-conversion operation and an amplification operation on the baseband signal. The radio unit 25 thus transmits a radio signal from the antenna 30. A radio signal is received by the base station 3. On the other hand, the radio unit 25 performs an amplification operation, a down-conversion operation, and an analog-to-digital (AD) conversion operation on the radio signal received via the antenna 30. The baseband signal obtained as a result is transferred to the BB processor 24. The radio unit 25 includes an electric and electronic circuit.

Hardware Configuration of Information Processing Apparatus

A hardware configuration of an information processing apparatus (computer) that may function as each of the core network device 4 and the billing device 5 is described below. If each of the core network device 4 and the billing device 5 is implemented as an apparatus in a unitary body, a personal computer (PC), a workstation, or an existing hardware architecture of a general-purpose server machine may be applicable as the hardware configuration of the information processing apparatus. Each of the core network device 4 and the billing device 5 may be implemented by a combination of two or more computers that are communicable with each other.

Figure 4:
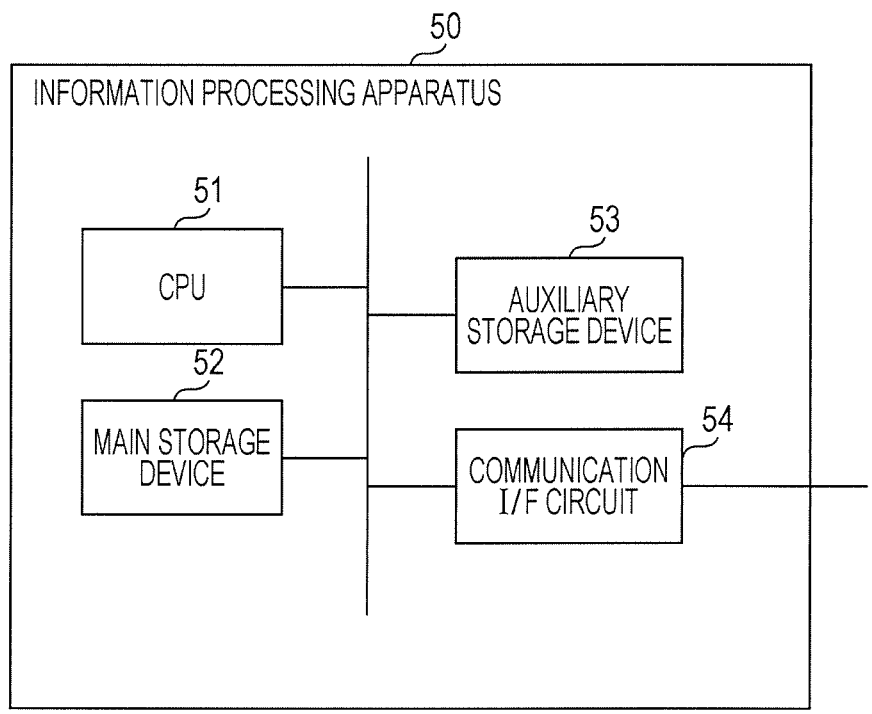
FIG. 4 illustrates a hardware configuration of a core network device, namely, an image forming apparatus that functions as a billing device.

FIG. 4 illustrates a hardware configuration of an information processing apparatus 50. As illustrated in FIG. 4, the information processing apparatus 50 includes a CPU 51, a memory (main storage device) 52, an auxiliary storage device 53, and a communication interface (I/F) circuit 54. The CPU 51, the memory 52, the auxiliary storage device 53 and the communication I/F circuit 54 are mutually connected to each other via a bus B1.

The memory 52 functions as a main memory device to be used as a working area of the CPU 51. The memory 52 includes a RAM and a ROM. The auxiliary storage device 53 stores a variety of programs to be executed by the CPU 51 and data to be used in the execution of each program. The auxiliary storage device 53 is a non-volatile recording medium, and includes at least one of the hard disk, the flash memory, and the EEPROM. Each of the memory 52 and the auxiliary storage device 53 is an example of a recording medium.

The communication I/F circuit 54 controls communication, and an existing network card or an interface device called a network interface card (NIC) for connection with a local area network (LAN) may be used for the communication I/F circuit 54. The communication I/F circuit 54 is an example of a communication device.

The information processing apparatus 50, including an I/O device (not illustrated), may be connected to an input device, such as a keyboard, a button, a pointing device, or a touch-panel, and an output device, such as a display device. The input device and the output device provide a user interface (UI) for an administrator or an operator to input information or acquire information.

The CPU 51 loads a program installed on the auxiliary storage device 53 to the memory 52 to execute the program. The CPU 51 thus functions as each of the core network device 4 and the billing device 5. The CPU 51 is an example of a processor (microprocessor) or a controller. The DSP may be used in place of the CPU 51.

Radio Communication Between External Storage Device and Terminal

Figure 5:
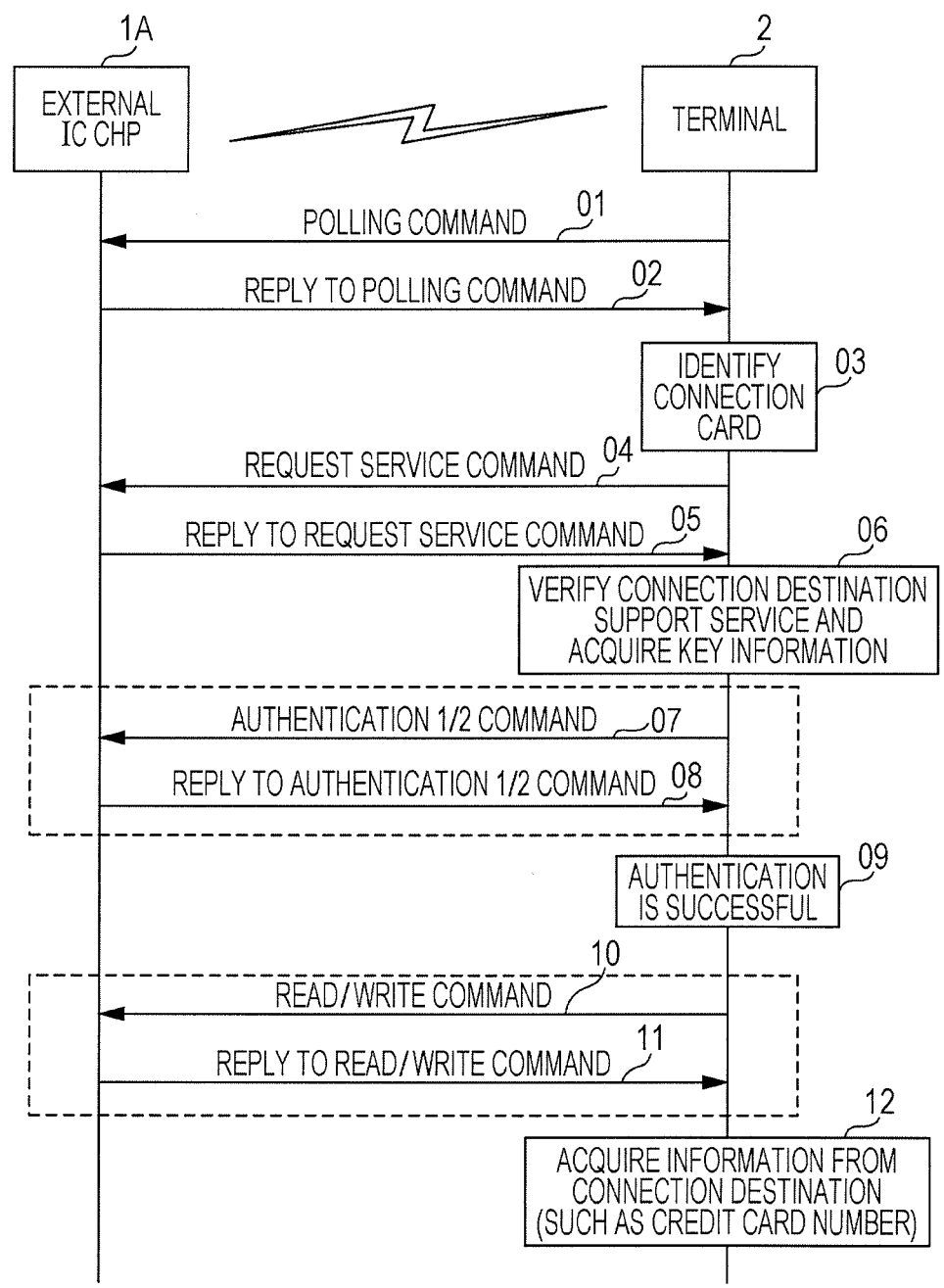
FIG. 5 illustrates an example of radio communication between a card having an external IC chip as an example of an eternal storage device and a terminal.

FIG. 5 illustrates an example of radio communication performed between a card 1A (such as a card including an IC chip) as an example of the external storage device 1 and the terminal 2. As illustrated in FIG. 5, radio communications complying with Felica (registered trademark) are performed between the external IC chip 1A and the terminal 2. Radio communications complying with another communication standard, such as Bluetooth, may also be performed between the external IC chip 1A and the terminal 2.

The terminal 2 performs a connection procedure with the external IC chip 1A. The IC chip communication circuit 23 in the terminal 2 transmits a polling command to the external IC chip 1A (01). If the distance between the external IC chip 1A and the terminal 2 falls within a radio communication coverage, the external IC chip 1A may receive the polling command. Upon receiving the polling command, the external IC chip 1A transmits a reply message responsive to the polling command (02). When the replay message is received by the IC chip communication circuit 23, the controller 21 identifies the external IC chip 1A in accordance with identity information of the external IC chip 1A included in the reply message (03). The external IC chip 1A is connected to the terminal 2 in this way.

The external IC chip 1A and the terminal 2 perform a service verification procedure. The terminal 2 transmits a request service command to the external IC chip 1A (04). The external IC chip 1A transmits a reply message responsive to the request service command to the terminal 2 (05). Upon receiving the reply message, the controller 21 in the terminal 2 verifies service content supported by a connection destination (the external IC chip 1A), and acquires pre-stored key information (06).

The terminal 2 performs an authentication procedure using the key information. More specifically, the terminal 2 transmits authentication 1/2 command as an authentication request message to the external IC chip 1A (07). The authentication 1/2 command includes authentication information, such as the key information. The external IC chip 1A performs an authentication operation in accordance with the authentication information included in the authentication 1/2 command, and transmits a reply message (authentication response) including authentication results to the terminal 2 (08). When the terminal 2 receives the reply message, the controller 21 determines whether the authentication result is successful or not (09). If the authentication result is successful, processing proceeds. If the authentication result is unsuccessful, the connection with the external IC chip 1A is disconnected. With this authentication procedure, encrypted communication using the key information is performed thereafter. Security is thus ensured in the communication between the terminal 2 and the external IC chip 1A. It may be optional that such authentication procedure (operations 07 through 09 surrounded in a broken-lined box) is omitted.

A transmission and reception operation of the billing information is performed as one of the data access operations to the external IC chip 1A. The terminal 2 transmits to the external IC chip 1A a command (read command) to read the billing information (such as a credit card number) stored on the external IC chip 1A as a read/write command (10). The external IC chip 1A generates a reply message responsive to the read/write command (read command) and including the billing information and transmits the reply message to the terminal 2 (11). In this way, the controller 21 in the terminal 2 acquires the billing information (such as a credit card number) from the external IC chip 1A (12).

The terminal 2 may write desired information on the external IC chip 1A by exchanging a write command. Security may be increased by encrypting a data portion, exchanged via the read/write command, using hush function. Used as an encryption key is Microsoft Network (MSN) (telephone number) of subscriber identity module (SIM) or international mobile equipment identity software (IMEISV) (terminal serial number) of the terminal.

Operation Related to Switching of Billing Information

Figure 6:
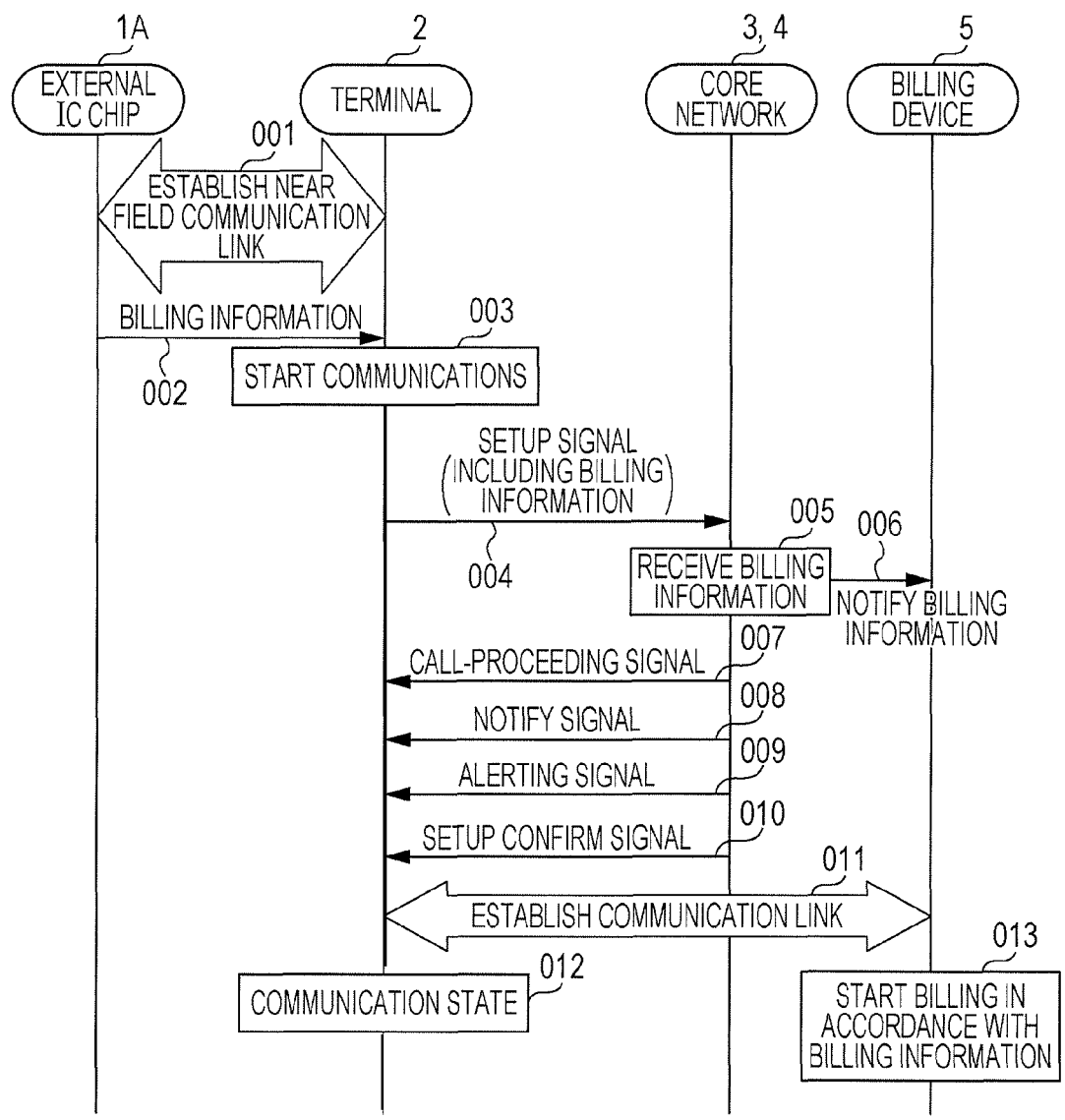
FIG. 6 illustrates a sequence chart illustrating an operation example of a mobile communication system of a second embodiment.

FIG. 6 illustrates a sequence chart illustrating an operation example of a mobile communication system of the second embodiment. In FIG. 6, a person (borrower) may borrow a terminal 2 of another person to perform voice communication.

The borrower holds the external storage device 1 sufficiently close to or in touch with the terminal 2. A near field communication connection procedure thus takes place between the external IC chip 1A and the terminal 2 as denoted by operations 01-09 of FIG. 5 (001). The billing information (the billing information (2)) stored on the external IC chip 1A is transmitted to the terminal 2 (002). The terminal 2 (the controller 21) thus receives and acquires the billing information (2).

An establishment procedure to establish a radio link (for example, a random access procedure in long term evolution (LTE)) is performed between the terminal 2 and the base station 3 (003). With the radio link established, the terminal 2 performs a procedure to establish a communication connection (message exchange) with the core network device 4 via the base station 3. In the message exchange, a tentative identity number of the terminal is issued and then received in the mobile communication system.

FIG. 6 illustrates the message exchange in the communication connection procedure complying with wideband code division multiple access (W-CDMA). In the message exchange, a control signal including a message is exchanged. In the procedure, a setup signal as a call setup request signal is transmitted to the core network device 4 (004). The core network device 4 transmits to the terminal 2 a call-proceeding signal as a call setup reception signal (008), a notify signal (009), an alerting signal as a call signal of an arrival destination (communication partner) (009), and a setup-confirm signal as a call setup confirmation signal (010). The terminal 2 then receives these signals. Through the exchange of these messages, the terminal 2 establishes a communication link (call) with the communication partner (011), and communications (call) are performed between the terminal 2 and the communication partner (012).

To transmit a signal to the core network device 4, the controller 21 in the terminal 2 generates information (data) to be superimposed on the signal, and the BB processor 24 and the radio unit 25 generate a radio signal including the data. The radio signal is then transmitted from the antenna 30. The base station 3 extracts the data from the radio signal, and transfers the data to the core network device 4 via the network. In the core network device 4, the data received by the communication I/F circuit 54 (FIG. 4) is transferred to the CPU 51.

In accordance with the program, the CPU 51 in the core network device 4 performs an operation on the data in view of the content of the data. The CPU 51 generates information (data) addressed to a specific determination (the terminal 2 or the billing device 5), and transmits a signal including the data from the communication I/F circuit 54. The signal addressed to the terminal 2 is converted into a radio signal by the base station 3 and then transmitted to the terminal 2. The terminal 2 acquires the information (data) from the core network device 4 by extracting the data from the radio signal. The signal transmitted from the core network device 4 and addressed to the billing device 5 is received by the communication I/F circuit 54 in the billing device 5, and the data in the signal is received by the CPU 51. The CPU 51 in the billing device 5 performs an operation on the acquired data in accordance with the program.

The billing information (2) acquired by the terminal 2 in operation 002 is superimposed on a message (call setup signal) related to a call setting and is then transferred to the core network device 4. In the example of FIG. 6, the billing information (2) is included in the setup signal as a call setup request signal and the setup signal is transferred to the core network device 4 (004). The signal having the billing information (2) superimposed thereon is different depending on the radio access scheme and the communication type. The billing information (2) may be transferred using an exclusive message to transfer the billing information.

Upon receiving the billing information (2) (005), the core network device 4 notifies (transfers) to the billing device 5 the billing information (2) together with identity information (such as a telephone number) of the terminal 2 (006). The same transfer method as the existing transfer method of transferring the billing amount (communication duration or a packet count) calculated by the core network device 4 to the billing device 5 is applicable as a method of transferring the billing information from the core network device 4 to the billing device 5.

Upon receiving the billing information (2), the CPU 51 in the billing device 5 performs the operation described below. The auxiliary storage device 53 in the billing device 5 stores, as billing control information, an association between the identity information of the terminal 2 (such as a telephone number) and billing information corresponding to the telephone number. The association may be managed as an entry in a table representing the association between the telephone number and the billing information.

Upon receiving the billing information (2) and the telephone number from the core network device 4, the CPU 51 identifies an entry that stores the received telephone number, and switches from the billing information (1) stored in the entry to the received billing information (2). The original billing information (1) is temporarily saved (stored) in a specific memory area so that the billing information (1) is retrieved later. The billing information (2) is registered in the entry, and a flag may be set to indicate which billing information, the billing information (1) or the billing information (2), is active. For example, the billing information having a flag set may be active.

The billing device 5 starts billing in accordance with the activated billing information (2) (013). More specifically, the fee resulting from the communication is billed to the borrower in accordance with the activated billing information (2).

As illustrated in FIG. 6, the switching of the billing address is performed at the start of the communication establishment. In contrast, the billing device 5 may switch the billing destination after the communication establishment. For example, after the communication establishment, the terminal 2 transmits the billing information (2) stored on the external IC chip 1A (the external storage device 1) to the billing device 5, and the billing device 5 switches the billing destination.

In such a case, the billing information (2) may be transmitted to the billing device 5 using a mail server in a short message service (SMS) system or an electronic mail system. Alternatively, the billing information (2) may be transmitted as ordinary user data or an ordinary control signal, in place of the SMS or the electronic mail, using packet communication.

Figure 7:
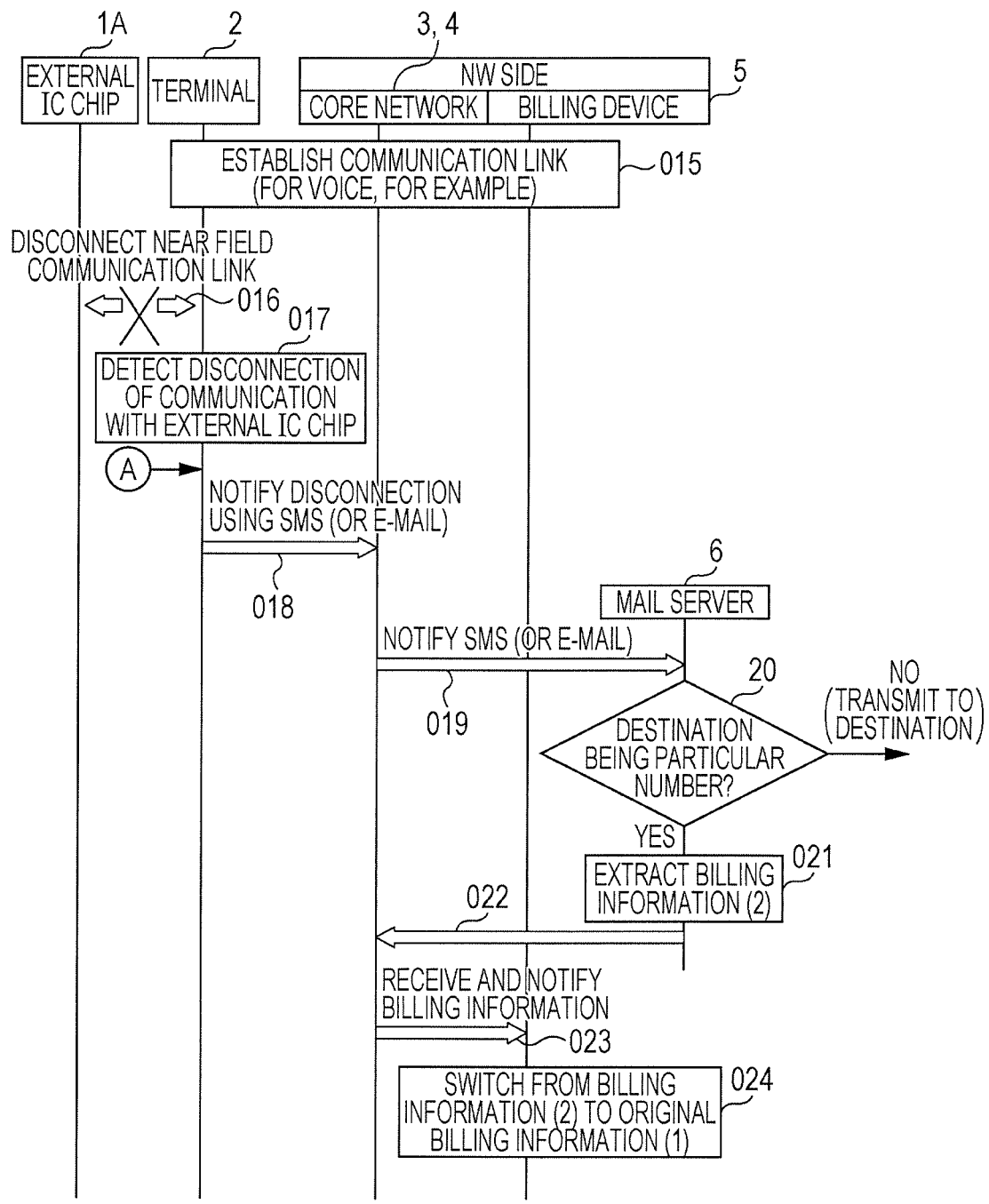
FIG. 7 illustrates a sequence chart illustrating an operation example (first operation example) in which a radio communication link between the external IC chip and the terminal is disconnected after the billing device switches billing information.

First operation example at radio communication disconnection between external storage device and terminal FIG. 7 is a sequence chart of a first operation example of the mobile communication system. The first operation example is performed when the radio communication between the external IC chip 1A and the terminal 2 is disconnected after the billing device 5 switches to the billing information (2).

If the distance between the external IC chip 1A and the terminal 2 increases to the extent that the radio communication is difficult to maintain during the communication of the terminal 2 using the base station 3 (in communication established state 015) or if a fault occurs in the external IC chip 1A during the communication of the terminal 2 using the base station 3, the radio communication between the external IC chip 1A and the terminal 2 is disconnected (016).

The controller 21 in the terminal 2 monitors the radio communication with the external IC chip 1A by monitoring the IC chip communication circuit 23. For example, in response to a signal input from the IC chip communication circuit 23 at the disconnection of the radio communication, the controller 21 detects that the radio communication with the external IC chip 1A has been disconnected (017).

The controller 21 in the terminal 2 in turn generates a short mail (a mail used in the SMS) including information indicating the disconnection of the radio communication between the external IC chip 1A and the terminal 2. For example, the controller 21 generates a particular number for the transmission of the disconnection notification (such as 0120-*-*) as a short mail destination. The short mail (disconnection notification) includes the billing information.

The short mail is transmitted to the base station 3. The base station 3 and the core network device 4 function as a transmission channel of a mail server 6 connected to the network. The short mail finally arrives at the mail server 6 (019).

The mail server 6 is identical in hardware configuration to the information processing apparatus 50 that includes the CPU 51, the memory 52, the auxiliary storage device 53, and the communication I/F circuit 54 as illustrated in FIG. 4. The CPU 51 in the mail server 6 performs an operation described below by loading a variety of programs stored on the auxiliary storage device 53 onto the memory 52.

When the communication I/F circuit 54 receives the short mail, the CPU 51 in the mail server 6 determines whether the destination of the short mail is a particular number (020). If the destination of the short mail is not a particular number, the CPU 51 in the mail server 6 performs an operation to transmit the short mail to the destination of the short mail (no branch in operation 020).

If the destination of the short mail is a particular number, the CPU 51 in the mail server 6 extracts the content of the short mail, namely, the disconnection notification including the billing information (2), and generates the short mail addressed to the core network device 4 (021). The short mail is transmitted from the communication I/F circuit 54 and then arrives at the core network device 4 (022).

Upon receiving the short mail via the communication I/F circuit 54, the CPU 51 in the core network device 4 performs an operation to transmit the disconnection notification including the billing information (2) of the short mail to the billing device 5 (023).

Upon receiving the disconnection notification, the CPU 51 in the billing device 5 identifies the entry in the table storing the billing information (2) included in the disconnection notification, and switches from the billing information (2) in the entry to the original billing information (1) once saved (activates the billing information (1)).

When the radio communication is disconnected between the external IC chip 1A and the terminal 2 after the billing device 5 switches to the billing information (2) stored on the external IC chip 1A, the terminal 2 transmits information for the billing device 5 to switch from the billing information (2) to the original billing information (1). The billing device 5 receives the switching notification via the mail server 6 and switches to the original billing information (1) in accordance with the billing information (2) included in the disconnection notification. The switching operation is performed regardless of whether the terminal 2 is performing communication or not.

The operation example discussed with reference to FIG. 7, namely, the switching operation to the original billing information triggered by the radio communication disconnection between the external IC chip 1A and the terminal 2 has the following advantageous effect. It is now assumed that the holder of the terminal 2 lends the terminal 2 to the other person, and that the other person performs communications (voice communication or data communication).

In a communication practice, the holder (user) may wish to continue communication with the terminal 2 returned back after the other person has completed the transmission and reception of information. In such a case, the holder spaces the external IC chip 1A apart from the terminal 2 to disconnect the radio communication, thereby causing the billing device 5 to switch the billing information of the terminal 2 to the original billing information (1).

If the holder (user) continues the communication using the terminal 2 returned back, the communication fee during the communication session is not billed to the other person (borrower). Even if the one communication session is jointly performed by the borrower and the user, the billing address may be changed. The settlement of the communication fee is appropriately performed.

In the discussion of FIG. 7, the terminal 2 transmits the short mail of the disconnection notification. The terminal 2 may use an electronic mail (e-mail) in place of the short mail. The short mail and the electronic mail are an example of "mail".

If an e-mail is used in place of the short mail, the controller 21 in the terminal 2 generates an e-mail including a disconnection notification (including the billing information (2)) having, as a destination address, an e-mail address exclusively used for the disconnection notification (such as kakin@ddd.jp). The e-mail is transmitted from the terminal 2 to the mail server 6 (functioning as a mail server of the e-mail) via the base station 3 and the core network device 4 (018 and 019). If the destination address of the e-mail is a particular e-mail address, the mail server 6 extracts the disconnection notification from the e-mail, and transmits the disconnection notification to the core network device 4 (020). The core network device 4 transmits the disconnection notification to the billing device 5.

As described above, the terminal 2 transfers the disconnection notification including the billing information (2) to the billing device 5 using the short mail or the e-mail. If the mobile communication system is a system for cellular phone, such as W-CDMA or LTE, specifications to transfer the disconnection notification to the billing device 5 are not currently formulated. For this reason, the disconnection notification is transferred to the billing device 5 using the short mail or the e-mail.

Figure 8:
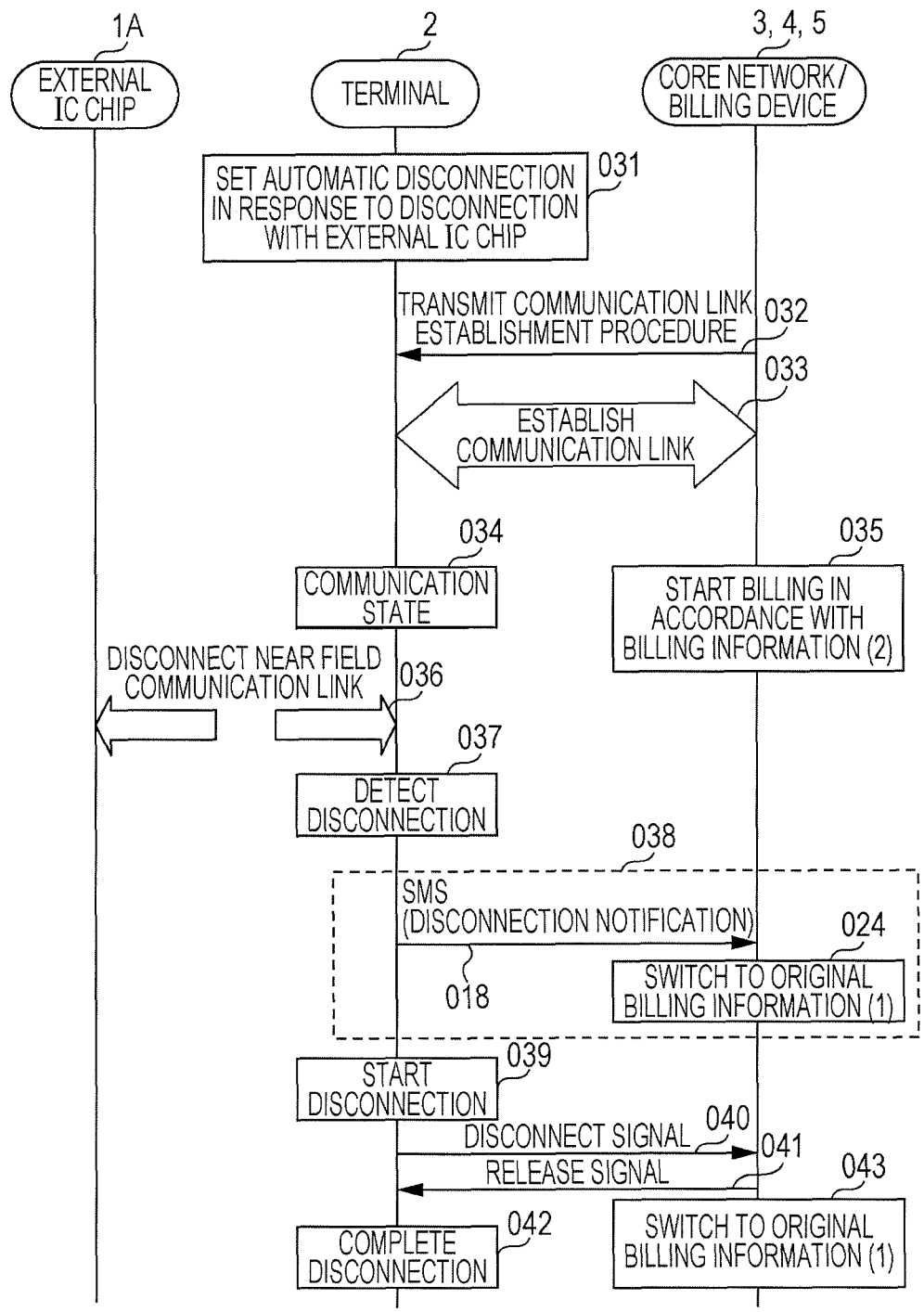
FIG. 8 illustrates a sequence chart illustrating an operation example (second operation example) in which a radio communication link between the external IC chip and a terminal is disconnected after the billing device switches billing information.

Second operation example at radio communication disconnection between external storage device and terminal FIG. 8 illustrates a second operation example of the mobile communication system, namely, a sequence chart of the operation example in which the radio communication between the external IC chip 1A and the terminal 2 is disconnected after the billing device 5 switches the billing information.

When the radio communication with the external IC chip 1A is disconnected as illustrated in FIG. 8, a setting is input to automatically disconnect the communication using the base station 3 (031). The setting is input by an operation on the input device 27 in the terminal 2.

A communication establishment procedure is performed using the base station 3 (032). The communication is thus established (connected) (033). Operations 032 and 033 are identical to operations 001 through 011 of FIG. 6 but illustrated in a simpler form, and the discussion thereof is omitted herein.

With the communication established, the terminal 2 is in a communication established state (034). The billing device 5 is ready to perform a billing operation in accordance with the billing information (2) (035). Operations 034 and 035 are respectively identical to operations 012 and 013 of FIG. 6.

When the radio communication between the external IC chip 1A and the terminal 2 is disconnected (036), the terminal 2 detects a communication disconnection (037). Operations 036 and 037 are respectively identical to operations 016 and 017 of FIG. 7. The same operations as operations 018 through 024 of FIG. 7 are performed (038), and the billing device 5 switches from the billing information (2) to the original billing information (1).

The controller 21 in the terminal 2 having detected (sensed) the disconnection of the radio communication starts a disconnection operation of the communication using the base station 3 in succession to the transmission of the mail including the disconnection notification (039). More specifically, the terminal 2 transmits to the core network device 4 a disconnect signal via the base station 3 (040). The core network device 4 performs a disconnection operation in response to the disconnect signal, and transmits to the terminal 2 via the base station 3 a release signal indicating the releasing of a communication resource (041).

The reception of the release signal completes the disconnection operation of the communication using the base station 3 (042). On the other hand, the core network device 4 having received the disconnect signal transmits to the billing device 5 a switching request message including a terminal ID of a terminal related to the disconnection.

The CPU 51 in the billing device 5 having received the switch request message identifies the entry corresponding to the terminal ID included in the switch request message, and activates the billing information (1) of the entry (switches from the billing information (2) to the billing information (1)) (043). In this way, the billing target reverts back to the original billing information (1).

Instead of using the switch request message, the billing information (2) may be superimposed (multiplexed) on the disconnect signal. In such a case, the core network device 4 having received the disconnect signal transfers to the billing device 5 the billing information (2) included in the disconnect signal. The billing device 5 performs an operation to switch from the billing information (2) to the original billing information (1) in the same manner as in operation 024 (FIG. 7) (043).

In each of operations 038 and 043 of FIG. 8, the operation to switch from the billing information (2) to the original billing information (1) is performed. With this arrangement, the switching to the original billing information (1) is triggered by the disconnection of the radio communication and the disconnection of the communication using the base station 3. However, operation 038 may be skipped. Alternatively, if operation 038 is performed, operation 043 may be skipped.

In the second operation example, the communication using the base station 3 is also disconnected when the radio communication between the external IC chip 1A and the terminal 2 is disconnected. The billing device 5 associates the original billing information (1) with the terminal 2. This arrangement sorts the communication fee for the holder (user) from the communication fee for the borrower in a clearer fashion.

Third Operation Example

Figure 9:
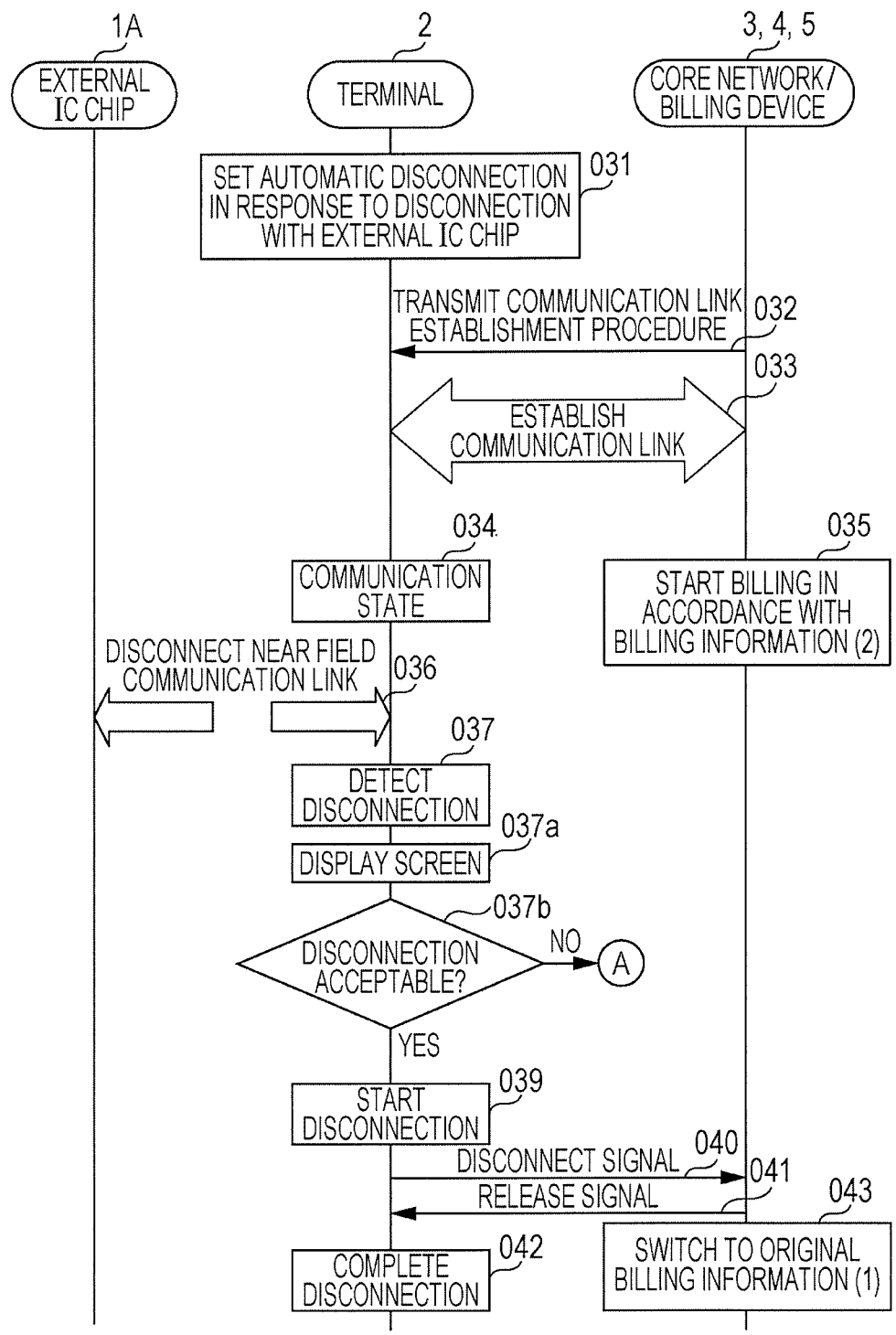
FIG. 9 illustrates a sequence chart of a third operation example.

FIG. 9 illustrates a sequence chart of a third operation example. The third operation example is one of the modifications of the second operation example of FIG. 8. In the third operation example of FIG. 9, operations 037a and 037b are inserted between operations 037 and 039. If the disconnection of the communication between the external IC chip 1A and the terminal 2 is detected in operation 037a, the controller 21 in the terminal 2 controls the LCD 28 and displays on the LCD 28 a message that asks the user whether to disconnect the communication using the base station 3.

In response to the displayed message, the user may input an instruction as to whether to permit the disconnection using the input device 27. The controller 21 determines whether or not the user has granted the disconnection (037b). If the disconnection is granted (yes branch from operation 037b), processing proceeds to operation 039, and the same operations in 039 through 043 as those in FIG. 8 are performed. If the disconnection is not granted (no branch from operation 037b), operation in 018 and subsequent operations of FIG. 7 are performed. In other words, the operations as those of the first operation example are performed.

In the modification of FIG. 9, the operator of the terminal 2 operates the terminal 2 to select between the first operation example and the second operation example. In the modification of FIG. 9, an automatic disconnection setting in operation 031 may be omitted.

Fourth Operation Example

Figure 10:
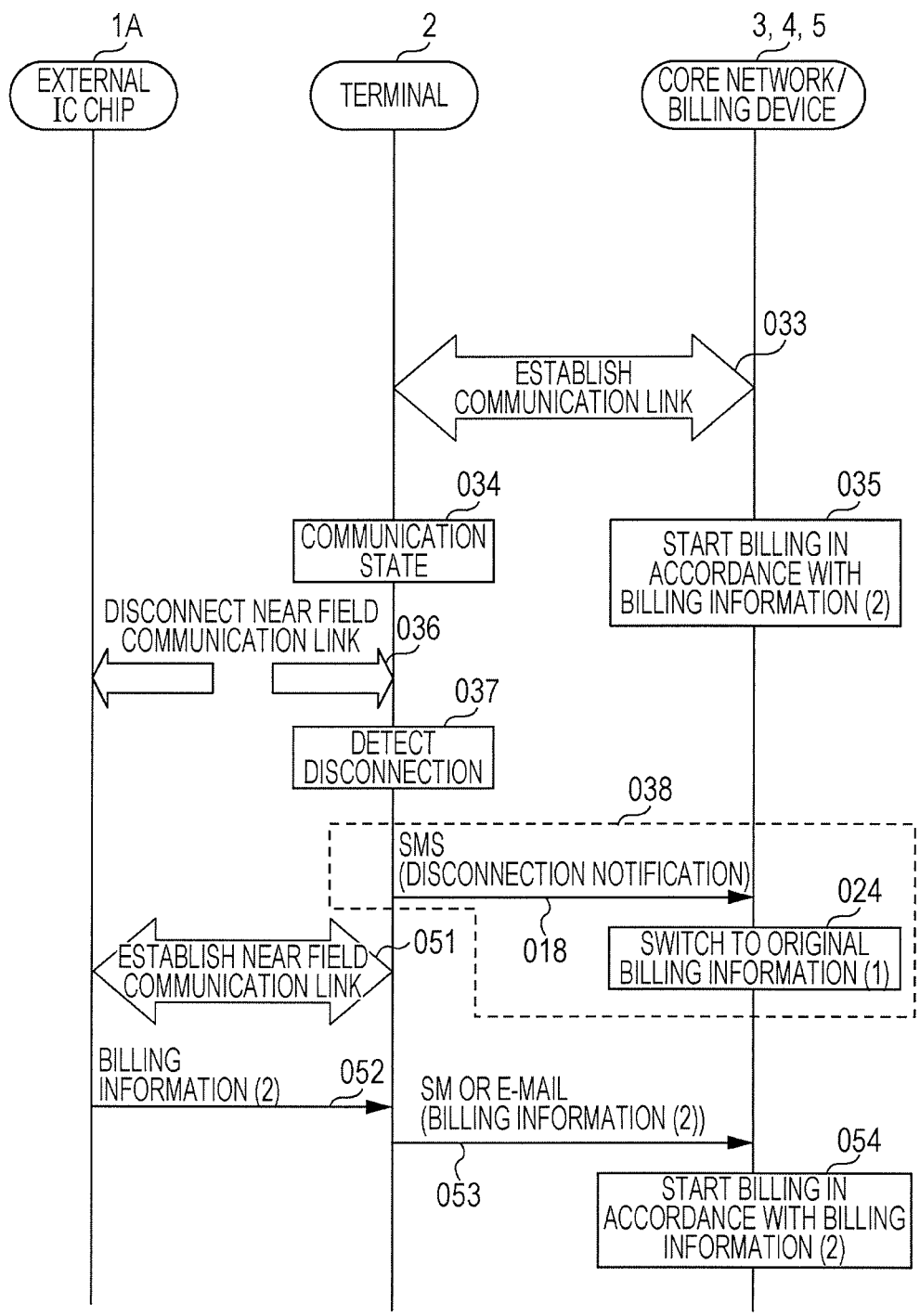
FIG. 10 illustrates a sequence chart of a fourth operation example.

FIG. 10 illustrates a sequence chart of a fourth operation example. The fourth operation example is one the modifications of the second operation example of FIG. 8. Operations 033 through 038 of FIG. 10 are identical to the counterparts thereof in FIG. 8, and the discussion thereof is omitted herein.

It is now assumed in operation 038 that the terminal 2 is currently in the communication using the base station 3 and that the radio communication resumes between the external IC chip 1A and the terminal 2 in the state that the billing information is switched from the billing information (2) associated with the terminal 2 to the original billing information (1) (051).

The external IC chip 1A transmits the billing information (2) to the terminal 2 (052). The controller 21 in the terminal 2 generates the short mail or the e-mail, including the billing information (2), and transmits the short mail or the e-mail to the base station 3. The billing information (2) is transmitted to the core network device 4 via the mail server 6, and the core network device 4 transfers the billing information (2) to the billing device 5 (052) in a method and a procedure substantially identical to those described with reference to operations 018 through 023 in FIG. 7. Using the received billing information (2), the billing device 5 switches from the billing information (1) associated with the terminal 2 back to the received billing information (2), and starts the billing operation in accordance with the billing information (2) (053).

The above discussion is based on the assumption that the external IC chip 1A performing the radio communication in operation 051 is the same as the external IC chip 1A that has been disconnected in operation 036. Alternatively, the external IC chip 1A performing the radio communication in operation 051 may an external IC chip different from the external IC chip 1A that has been disconnected in operation 036.

Fifth Operation Example

Figure 11:
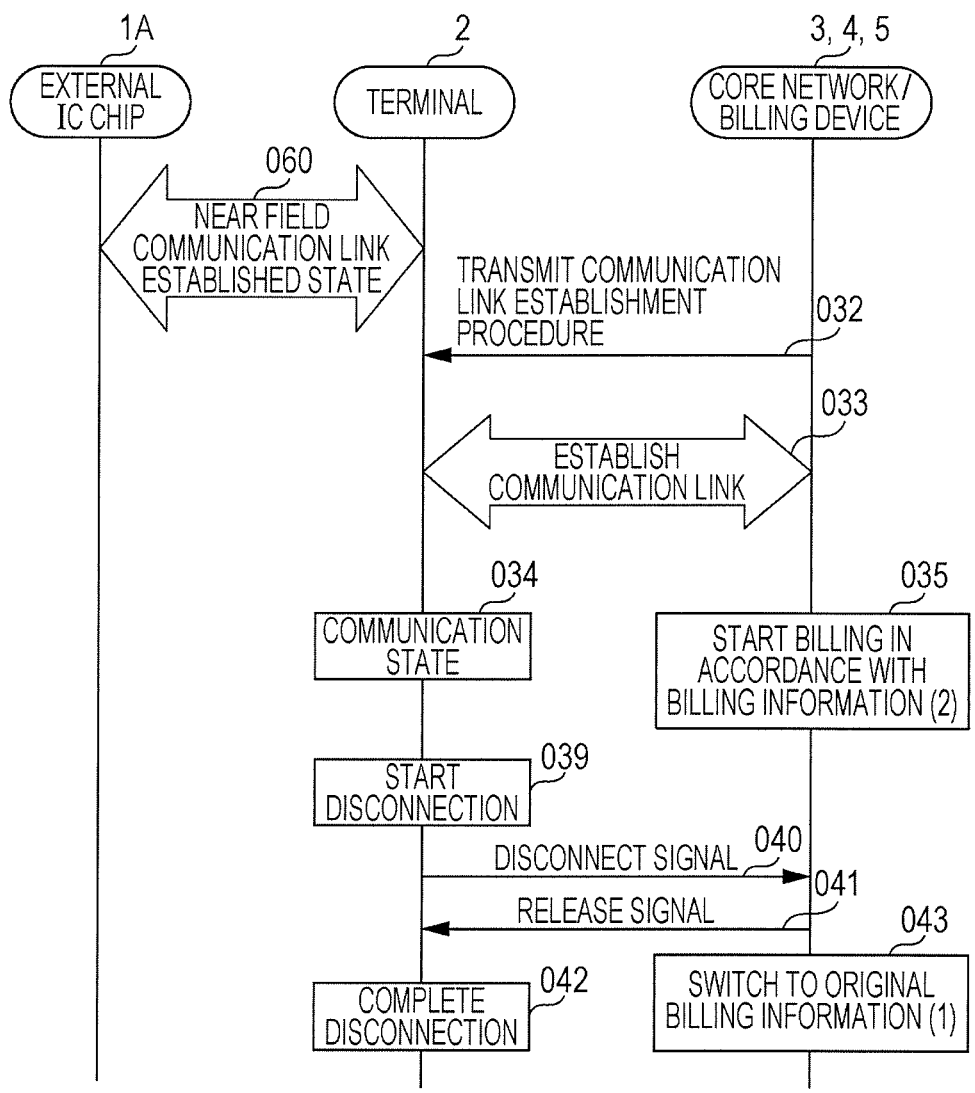
FIG. 11 illustrates a sequence chart of an operation example (fifth operation example) in which communication using a base station is disconnected with a radio communication in progress between the external IC chip and the terminal.

FIG. 11 illustrates a sequence chart of an operation example (fifth operation example) in which the communication using the base station 3 is disconnected with the radio communication in progress between the external IC chip 1A and the terminal 2. It is now assumed as illustrated in FIG. 11 that the external IC chip 1A and the terminal 2 are currently in the radio communication with each other (060), that the terminal 2 is currently performing the communication using the base station 3 (034), and that the billing device 5 is enabled to perform the billing operation based on the billing information (2) (035).

If an operation of the input device 27 in the terminal 2 inputs a communication disconnection instruction of the communication using the base station 3 under this condition, the controller 21 in the terminal 2 starts a disconnection operation (039). Operations 040 through 043 are then performed in the same manner as described with reference to FIG. 8. The billing device 5 thus switches from the billing information (2) back to the original billing information (1).

The billing information (2) is thus switched back to the original billing information (1) in the fifth operation example if the communication of the terminal 2 using the base station 3 is disconnected even with the external IC chip 1A currently in the radio communication with the terminal 2. The operations 040 through 043 may be the switching operation of the billing device 5 in response to the switching request message based on the disconnect signal or the switching operation of the billing device 5 in response to the billing information (2) superimposed on the disconnect signal.

The fifth operation example has the following advantageous effect. If the external IC chip 1A and the terminal 2 are placed into contact with each other using an adhesive tape or a rubber band to maintain the communication state between the terminal 2 and the external IC chip 1A, the terminal 2 maintains the radio communication state with the external IC chip 1A even after the terminal 2 ends the communication using the base station 3.

If the billing device 5 does not switch the billing information in this case, the billing operation is performed in accordance with the billing information (2) without any such intention during a next session of the communication using the base station 3. In the fifth operation example, the switching from the billing information (2) to the original billing information (1) is triggered by the disconnection of the communication using the base station 3 regardless of the communication state between the external IC chip 1A and the terminal 2. In this way, the execution of an unintended billing operation based on the billing information (2) is controlled. Reliability involved in the temporary change of the billing destination to the billing information (2) (reliability in reverting to the billing information (1)) is increased.

Sixth Operation Example for Data Communication

Figure 12:
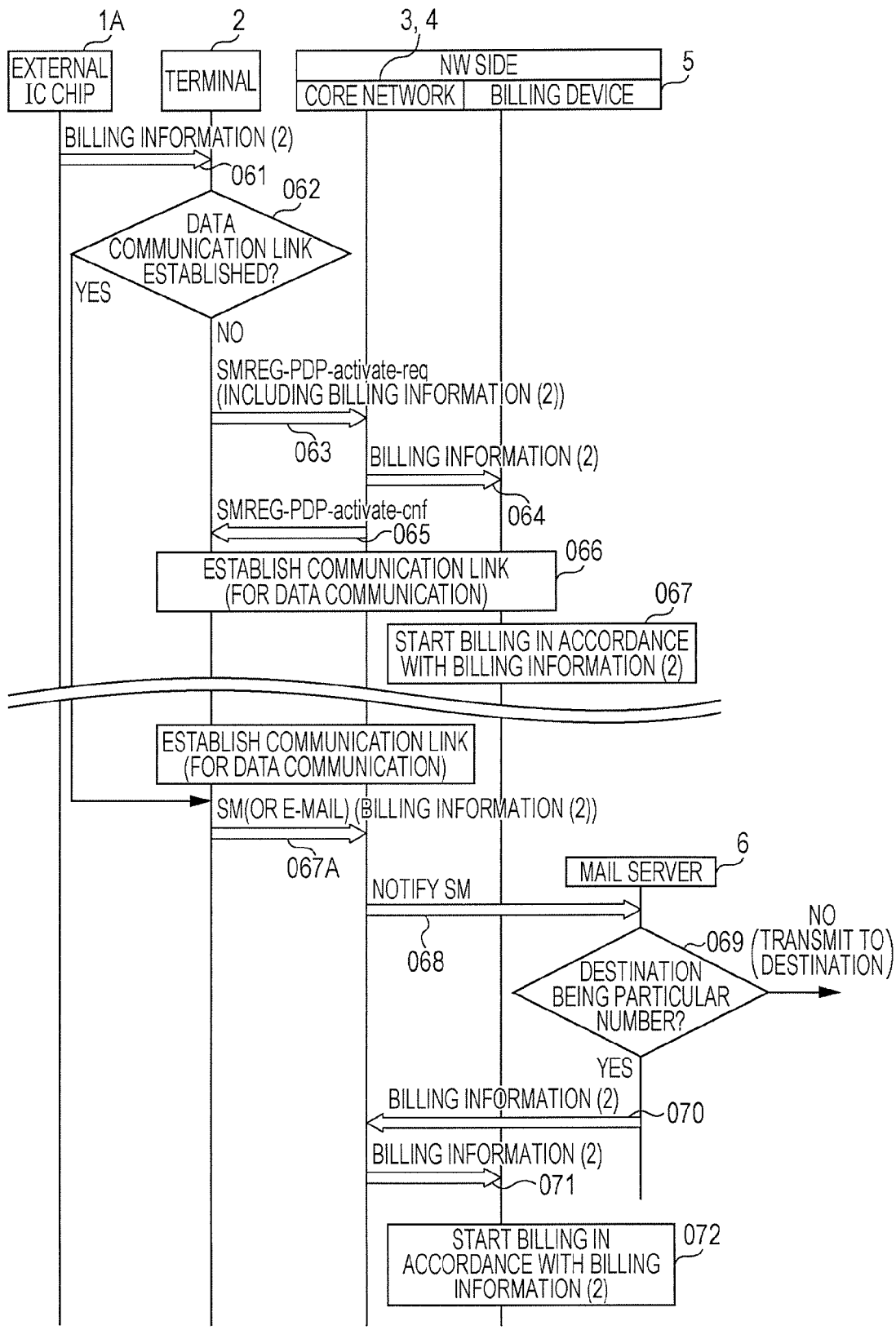
FIG. 12 illustrates a sequence chart of an operation example (sixth operation example) with data communication using the base station performed.

In the first through fifth operation examples, the terminal 2 performs the telephone communication (voice communication) using the base station 3. FIG. 12 illustrates a sequence chart of an operation example (sixth operation example) when data communication using the base station is performed.

Referring to FIG. 12, the terminal 2 acquires the billing information (2) from the external IC chip 1A via the radio communication (061). If the terminal 2 is not in the data communication (no branch from operation 062), the controller 21 in the terminal 2 stores the acquired billing information (2). The terminal 2 includes the billing information (2) in a control signal (SMREG-PDP-activate-req signal of FIG. 12) that is transmitted for data communication start when an operation of the terminal 2 starts data communication, and the terminal 2 then transmits the control signal to the network side.

When the control signal reaches the core network device 4 via the base station 3, the core network device 4 transfers the billing information (2) to the billing device 5. The billing device 5 switches from the billing information (1) associated with the terminal 2 to the billing information (2) (067).

Upon receiving the control signal, the core network device 4 performs an operation to establish a data communication link, and transmits to the terminal 2 a reply signal (a SMREG-PDP-activate-cnf signal) responsive to the control signal. When the terminal 2 receives the reply signal, the data communication link is established. The terminal 2 thus performs the data communication with a communication partner. Information related to the fee of the data communication (a billing amount such as a packet quantity) is notified to the billing device 5. The billing device 5 performs a billing operation of a fee responsive to the billing amount in accordance with the billing information (2). The fee related to the data communication is billed to the borrower of the terminal 2.

If the data communication is performed (with the data communication link established) when the billing information (2) is acquired (yes branch from operation 062), an operation to transfer the billing information (2) to the billing device 5 via the short mail or the e-mail is performed.

As illustrated in FIG. 12, the short mail or the e-mail including the billing information (2) is transmitted to the mail server 6 via the base station 3 and the core network device 4 (067A and 068). The mail server 6 determines whether the destination address of the short mail or the e-mail is a particular address (069). If the destination address is a particular address (yes branch from operation 069), the billing information (2) extracted from the short mail or the e-mail is transferred to the core network device 4 (070). The core network device 4 transmits the billing information (2) to the billing device 5 (071). The billing device 5 thus switches from the billing information (1) to the billing information (2).

The billing information is switched from the billing information (1) to the billing information (2) even during the data communication in this way. More specifically, the billing destination for the data communication may be changed from the holder (user) of the terminal 2 to the borrower.

The operations 067 through 072 are applicable as operations to be preformed when the billing information (2) is acquired during the voice communication (telephone call).

Figure 13:
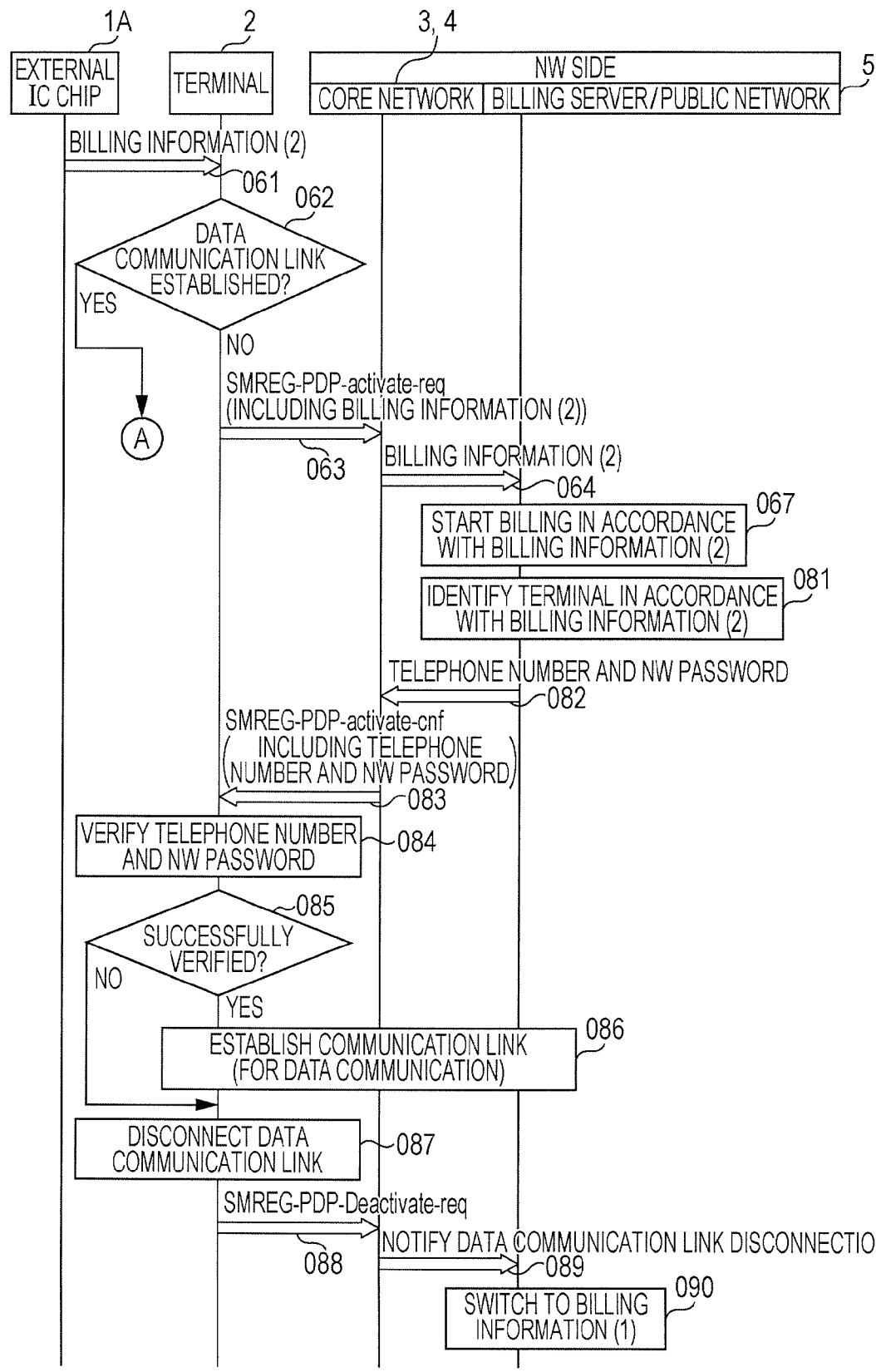
FIG. 13 illustrates a sequence chart of an operation example (seventh operation example) with the data communication using the base station performed.
Figure 14:
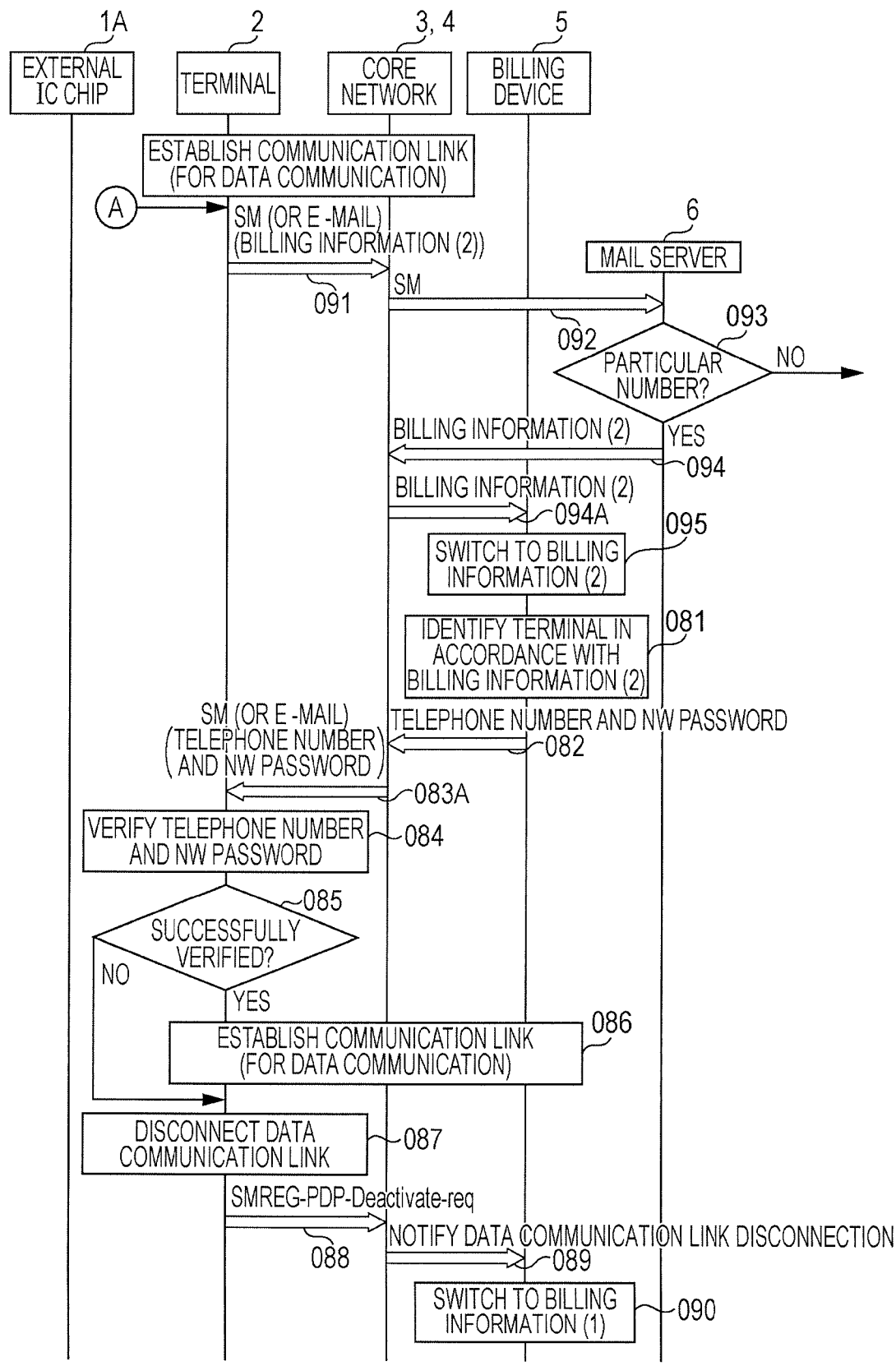
FIG. 14 illustrates a sequence chart of an operation example (seventh operation example) with the data communication using the base station performed.

Seventh Operation Example for Authentication Between External IC Chip and Terminal FIG. 13 and FIG. 14 illustrate a sequence chart of an operation example (seventh operation example) with the data communication using the base station performed. In the seventh operation example, the external IC chip 1A (the external storage device 1) is authenticated.

Operations 061 through 064 of FIG. 13 are respectively identical to the operations 061 through 064 of FIG. 12. The billing device 5 having received the billing information (2) in operation 067 switches from the billing information (1) to the billing information (2), thereby starting billing in accordance with the billing information (2).

The billing device 5 then identifies the terminal corresponding to the billing information (2) based on the billing information (2) (acquires authentication information) (081). For example, the auxiliary storage device 53 (FIG. 4) in the billing device 5 includes a database (DB) that stores the authentication information related to the billing information (2).

FIG. 15 illustrates an example of the database. Referring to FIG. 15, the billing information (2) stored on the external IC chip 1A includes a card number, and authentication information including a telephone number and a network (NW) password and associated with the card number. The authentication information may be one of the telephone number and the NW password, or may be a different type of password.

Upon acquiring from the DB the authentication information (the telephone number and the NW password) corresponding to the billing information (2) in operation 081, the CPU 51 in the billing device 5 transfers the authentication information to the core network device 4 (082). The core network device 4 includes the telephone number and the NW password in the SMREG-PDP-activate-cnf signal as a signal responsive to the SMREG-PDP-activate-req signal, and then transmits the SMREG-PDP-activate-cnf signal to the terminal 2 (083).

Upon receiving the telephone number and the NW password included in the SMREG-PDP-activate-cnf signal, the controller 21 in the terminal 2 causes the LCD 28 to display an input screen for the authentication information. The borrower of the terminal 2 enters the telephone number and the NW password using the input device 27 in accordance with a guide displayed on the input screen of the input device 27.

The controller 21 in the terminal 2 verifies whether the input telephone number and NW password match the telephone number and NW password acquired from the NW side (085). If the input telephone number and NW password respectively match the counterparts thereof (yes branch from operation 085), the data communication link is established (086).

If the input telephone number and NW password fail to match the counterparts thereof (no branch from operation 085), the terminal 2 disconnects the data communication (087), and transmits an SMREG-PDP-Deactivate-req signal as a disconnect message to the core network device 4 via the base station 3. The core network device 4 performs a disconnection operation of the data communication and transmits to the billing device 5 a disconnection notification of the data communication (identity information of the terminal 2) (089). Upon receiving the disconnection notification, the billing device 5 switches from the billing information (2) to the original billing information (1) in accordance with the identity information of the terminal 2 (090).

If it is determined in operation 062 of FIG. 13 that the terminal 2 is performing the data communication, the terminal 2 generates a short mail (or an e-mail) including the terminal ID and the billing information (2), sets the destination address of the short mail to be a particular number (particular address), and then transmits the short mail to the core network device 4 (091 in FIG. 14).

In the same way as the disconnection notification of FIG. 7, the short mail reaches the mail server 6 via the base station 3 and the core network device 4 (092). If the destination address of the short mail is the particular address (yes branch from operation 093), the mail server 6 extracts the terminal ID and the billing information (2) from the short mail, and then transmits the terminal ID and the billing information (2) to the core network device 4 (094).

Upon receiving the terminal ID and the billing information (2), the core network device 4 transfers the terminal ID and the billing information (2) to the billing device 5 (094A). In response to the terminal ID, the billing device 5 switches from the billing information (1) to the billing information (2) (095).

The same process as that of FIG. 13 is performed (operations 081 through 090 in FIG. 14). The telephone number and the NW password, when transferred from the core network device 4 to the terminal 2, are included in the short mail (or the e-mail).

In the seventh operation example, prior to the data communication or during the data communication, the external IC chip 1A is authenticated when the billing information (2) stored on the external IC chip 1A is transmitted to the NW side. If the external IC chip 1A has been successfully authenticated (the holder of the external IC chip 1A has been successfully authenticated), the billing operation is normally performed based on the data communication and the billing information (2). If the authentication operation has failed (has been unsuccessful), the data communication is disconnected. The billing information (2) then reverts back to the original billing information (1).

The authentication function of the seventh operation example makes it difficult for any thief who has stolen the external storage device (the external IC chip 1A) to bill the communication fee for the use of the stolen external storage device (the external IC chip 1A) to the right holder of the external IC chip 1A. In other words, the unauthorized use of the external IC chip 1A is controlled.

The authentication operation is performed by determining match of the telephone numbers, authentication numbers such as the NW passwords, or authentication information called authentication codes. Instead of a direct input of the authentication information in the seventh operation example, the terminal 2 may acquire the authentication information stored on the external storage device (the external IC chip 1A) in response to an input of specific information and the authentication information is then matched against the authentication information acquired from the NW side.

Figure 16:
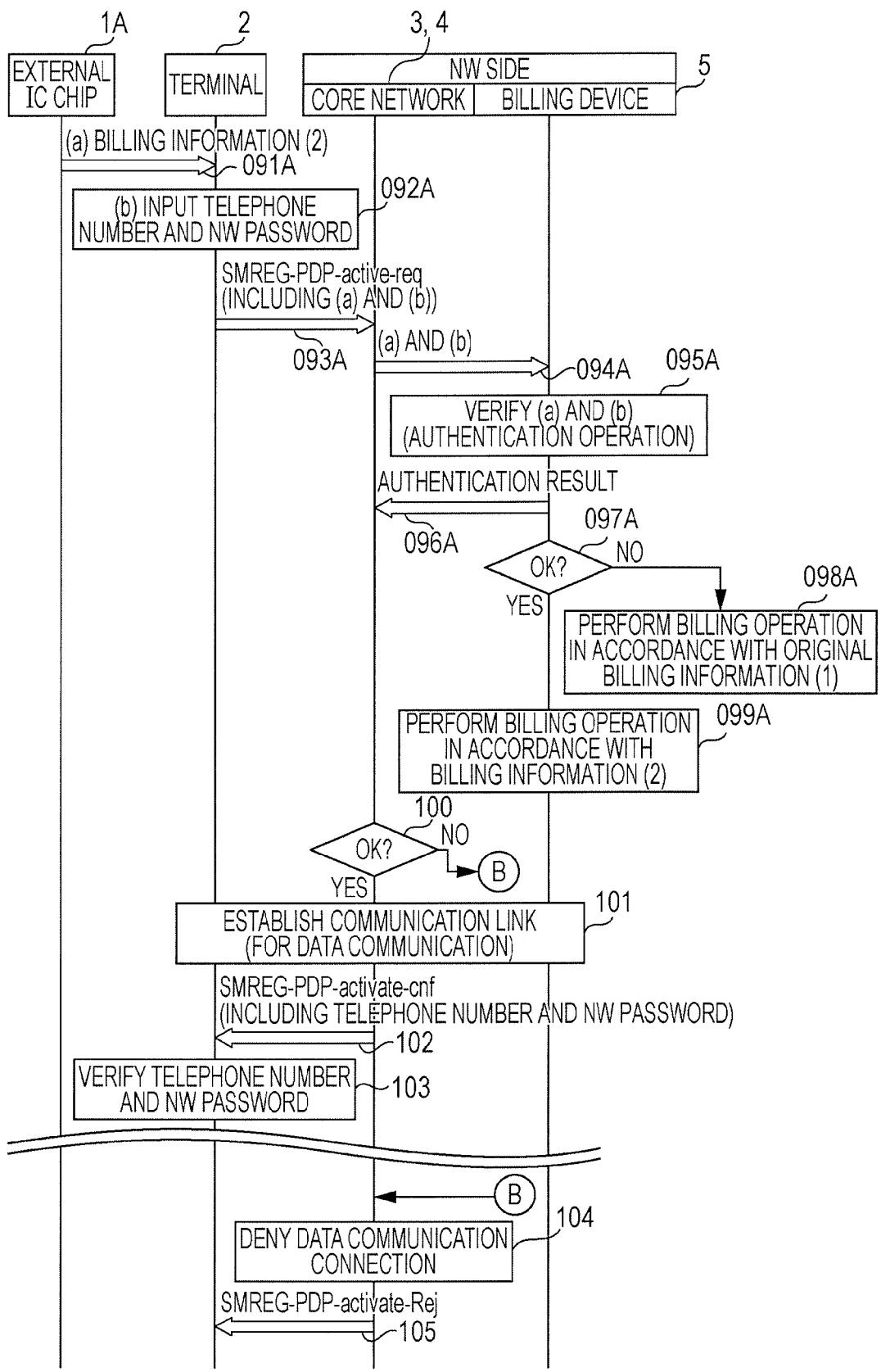
FIG. 16 illustrates a sequence chart of an eighth operation example.

Eighth Operation Example for Authentication on Billing Device of External IC Chip FIG. 16 illustrates a sequence chart of an eighth operation example. The eighth operation example is a modification of the seventh operation example where the authentication operation is performed on the billing device 5.

When the terminal 2 acquires the billing information (2) from the external IC chip 1A (091A) as illustrated in FIG. 16, the controller 21 in the terminal 2 displays an input screen of the authentication information (such as the telephone number and the NW password) on the LCD 28. When the authentication information is entered using the input screen and the input device 27 (092A), the terminal 2 transmits to the core network device 4 the control signal (the SMREG-PDP-active-req signal) for data communication start including the billing information (2) and the authentication information (093A).

Upon receiving the SMREG-PDP-active-req signal, the core network device 4 transmits to the billing device 5 the billing information (2) and the authentication information together with the terminal ID (094A). The billing device 5 includes the database (DB) of FIG. 15, and performs an authentication operation by determining whether a combination of the billing information (2) and the authentication information has been registered in the DB (095A).

The billing device 5 transmits an authentication result (success or failure) to the core network device 4 (096A) and determines whether the authentication result is successful or unsuccessful (097A). If the authentication result is unsuccessful, switching to the billing information (2) is not performed, and the billing operation based on the original billing information (1) continues (098A). If the authentication result is successful, switching from the original billing information (1) to the billing information (2) is performed. The billing operation based on the billing information (2) is to be performed (099A).

The core network device 4 determines whether the authentication result is successful or unsuccessful (100). If the authentication result is successful, the core network device 4 establishes the data communication link and transmits a reply signal (SMREG-PDP-activate-cnf signal) responsive to the control signal for data communication start (102).

In operation 096, the telephone number and the NW password (authentication information), read from the DB together with the authentication result, are transmitted to the core network device 4, and the reply signal includes the telephone number and the NW password. When the terminal 2 receives the reply signal, the controller 21 in the terminal 2 checks the telephone number and the NW password included in the reply signal (103). In this way, the terminal 2 learns that the authentication operation performed on the NW side has been successful.

The terminal 2 checks the authentication information in the reply signal against the authentication information input in operation 092. If the two pieces of information fail to match, the terminal 2 may transmit a disconnection notification of the data communication. In this way, the two authentication operations performed at the NW side and the terminal 2 increase security.

If the authentication result is unsuccessful in operation 100, the core network device 4 refuses to establish the data communication (104), and transmits a control signal (SMREG-PDP-activate-rej signal) to reject data communication start (105). The control signal and the reply signal responsive to the control signal described with reference to the seventh operation example and the eight operation example are an example of a line establishment signal (call-confirmation signal).

In the eighth operation example, the billing device 5 performs the authentication operation. Alternatively, an authentication device different from the billing device 5 may be connected to the network, and the authentication information from the billing device 5 and the authentication information from the terminal 2 may be sent to the authentication device. The authentication device then transmits an authentication result to the billing device 5 and the core network device 4.

In the seventh and eighth operation examples, the authentication information may be encrypted before being transmitted. In the seventh and eighth operation examples, the authentication operation is performed in the data communication. Alternatively, the authentication operation may also be performed in the voice communication (telephone call).

As illustrated in FIG. 16, the control signal including the authentication information and the billing information (2) is transmitted when the data communication is established. During the data communication, however, the input authentication information and the billing information (2) are transmitted to the billing device 5 using the mail as described above, and operation 095 and subsequent operations are performed. If the authentication is successful, the authentication information is notified to the terminal 2 using the mail instead of operation 102.

Ninth Operation Example for Web Settlement

If a commercial product or a service is purchased in a Web site in the world wide web (WWW) using a credit card, the user typically enters the credit card number. Since the credit card number includes a number equal to or larger than 10, it may take time to input the credit card number or an input error may take place. There is also a possibility that the credit card number is illegally used by skimming.

In the ninth operation example, a web site may be accessed via the data communication using the borrowed terminal 2, and a commercial product or a service may be purchased. The billing information (2) (the credit card number) stored on the external storage device (the external IC chip 1A) is acquired and used as part of the input on a settlement information input screen for the payment for the commercial product or the service. The fee for the communication is billed to the borrower in accordance with the billing information (2) in the same way as in the seventh and eighth operation examples.

More specifically, it is determined whether the billing information (2) matches the information that is registered on the NW side in advance. If the two pieces of information match each other, the billing information (2) is used as part of the settlement information during the settlement on the web site. In this way, the inputting of the credit card number by the borrower is avoided.

The automatic input function of the credit card number increases the convenience of the settlement on the web site as described above. The billing information (2) (the credit card number) used as part of the input information is not displayed on the screen (or handled as internal information or symbols used in place of sensitive information such as the credit card number). Security of the settlement is thus increased.

Figure 17:
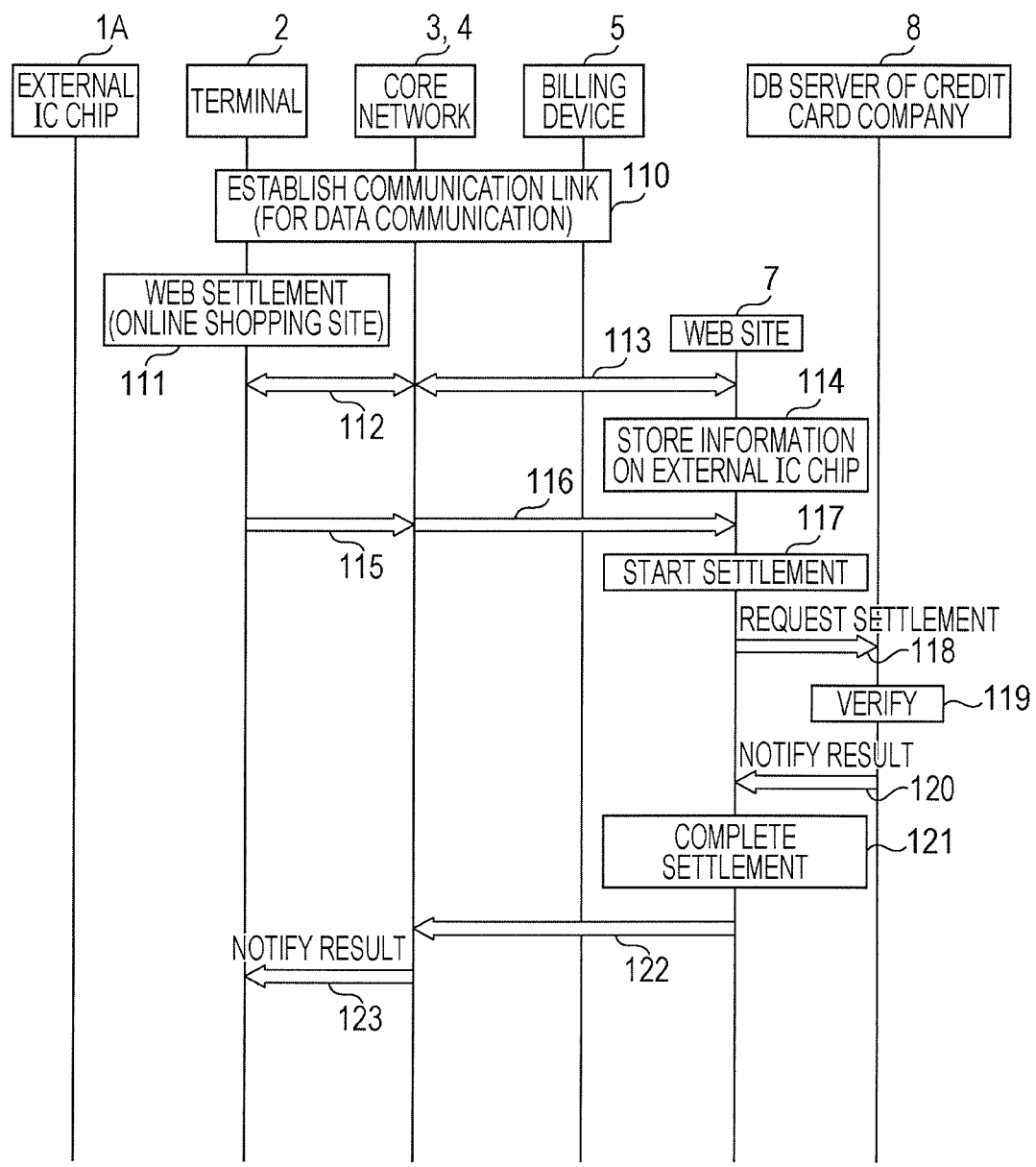
FIG. 17 illustrates a sequence chart of an operation example (ninth operation example) with the terminal performing a web settlement.

FIG. 17 illustrates a sequence chart of an operation (ninth operation example) with the terminal 2 performing a web settlement. Through the procedure of the seventh operation example or the eighth operation example, the billing operation for the fee based on the billing information (2) of the borrower of the terminal 2 is in an enabled state, and the data communication is in an established state, in the operation example of FIG. 17 (110).

It is now assumed that the borrower accesses a web site (online shopping site) 7 for online shopping, decides to purchase a commercial product or a service on the web site 7, and proceeds to a settlement information input screen (displayed on the LCD 28) (111). The web site 7 is managed by a web server apparatus that provides the web site 7. The web server apparatus is connected to the core network device 4 via the network. The web server apparatus is an example of a settlement apparatus.

If the borrower decides to pay the fee on the web site 7 on the settlement information input screen using the billing information (2) (the credit card number), a negotiation process is to be performed between the terminal 2 and the web site 7 as described below (112 and 113).

In the negotiation process between the terminal 2 and the web site 7, an access to the web site 7 is confirmed to be a communication using the external IC chip 1A through hypertext transfer protocol (HTTP) communication. In the negotiation process, the billing information (2) (the credit card number) acquired by the terminal 2 from the external IC chip 1A is transferred to the web site 7. The billing information (2) as external IC chip information is stored on the web site 7 (114).

The borrower inputs settlement information, such as name, address, and zip code, using the settlement information input screen and the input device 27. Note that the credit card number is not included in the settlement information as information to be input. The inputting of the credit card number by the borrower is thus omitted. Upon inputting the settlement information, the terminal 2 transmits the settlement information to the web site 7 (115 and 116).

The web site 7 starts a settlement operation in response to the reception of the settlement information (117). More specifically, the web site 7 requests a database server 8 of a credit card company to settle the payment through card information, namely, the credit card number (the billing information (2)). The database server 8 performs a verification operation of settlement approval, such as a credit operation (119). If the credit card number is authenticated, and good credit rating is confirmed, the database server 8 notifies the web site 7 that the settlement is approved (120).

Upon receiving the approved settlement result from the database server 8, the web site 7 completes the settlement operation (121), and transmits to the terminal 2 the settlement result (approved settlement) through the HTTP communication (122 and 123). The borrower may learn on the screen of the LCD 28 of the terminal 2 that the settlement using the credit card has been approved.

In the ninth operation example, the credit card number as the billing information (2) stored on the external IC chip 1A is treated as the internal information and is not displayed on the web screen. This saves the borrower the input step, and controls stealing by skimming.

Tenth Operation Example

In a tenth operation example described below, the fee billed to the borrower is notified to a terminal of the borrower after the communication of the borrower. If an event of switching from the billing information (2) to the original billing information (1) occurs when the communication using the terminal 2 by the borrower is complete or when the radio communication between the external IC chip 1A and the terminal 2 is disconnected, the billing device 5 transmits to the terminal of the borrower the billing amount based on the billing information (2).

With the addition of such function, the borrower may learn the billing amount occurred during the borrowing of the terminal 2 using the terminal of the borrower. In this way, the borrower may know the communication fee incurred during the borrowing of the terminal 2 and this improves user-friendliness.

Figure 18:
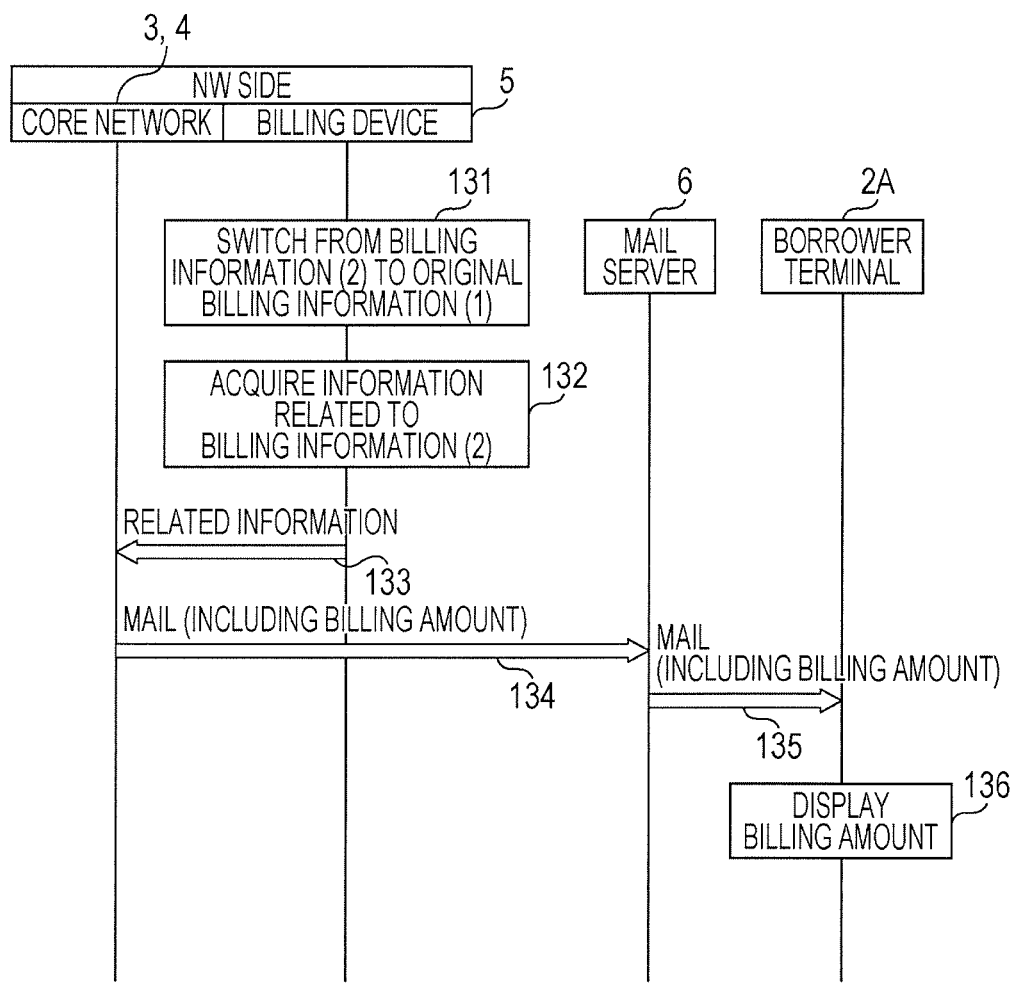
FIG. 18 illustrates a sequence chart of a tenth operation example (with a billing amount notified to a borrower terminal)

FIG. 18 illustrates a sequence chart of the tenth operation example (with a billing fee notified to a borrower terminal). An event of switching from the billing information (2) to the original billing information (1) occurs when the radio communication between the external IC chip 1A and the terminal 2 is disconnected (for example, the first through third operation examples as illustrated in FIG. 7 through FIG. 9) or when the communication using the terminal 2 by the borrower is complete (the fifth operation example as illustrated in FIG. 11 and the seventh operation example as illustrated in FIG. 13). In such a case, the billing device 5 switches to the original billing information (1) (131).

The billing device 5 (the CPU 51) acquires information related to the billing information (2) (132). More specifically, the billing device 5 acquires information of the fee for the communication (billing amount) billed to the borrower in accordance with the billing information (2) before switching to the original billing information (1). The billing device 5 references a database of FIG. 19 pre-stored on the auxiliary storage device 53 to acquire the information related to the billing information (2) (the card number in FIG. 19). In the example of FIG. 19, the database stores, in association with the billing information (2) (card number), the telephone number of the terminal of the borrower (terminal 2A), the NW password, and the mail address used on the terminal 2A.

In the tenth operation example, the CPU 51 in the billing device 5 acquires the telephone number and the e-mail address in association with the billing information (2). The CPU 51 then transfers to the core network device 4 the billing amount, the telephone number, and the e-mail address, as the related information (133).

Upon receiving the related information, the core network device 4 generates an e-mail including the billing amount, sets an e-mail address included in the related information to be a destination address of the e-mail, and then transmits the e-mail to the e-mail address (134).

The e-mail reaches the mail server 6 via the network. The mail server 6 transfers the e-mail to the terminal 2A (135). The e-mail is received by the terminal 2A via a mobile communication network (including the core network device 4 and the base station 3 of a cell having the terminal 2A within the coverage area thereof) not illustrated in FIG. 18.

The terminal 2A has the configuration of FIG. 2, for example, and the controller 21 has a mailer function. In response to an operation of the borrower, the controller 21 displays the contents of the e-mail on the LCD 28 (136). The borrower thus learns the billing amount for the fee of the communication performed during the borrowing of the terminal 2. The mail may be used as a billing statement for the fee incurred during the borrowing. The related information may include, in addition to the billing amount, itemized statement of the billing amount generated and managed by the billing device 5 (such as detailed statement of telephone call charge (voice communication) and data communication fee).

In the above example, the e-mail is transmitted. Alternatively, the short mail including the billing amount may be transmitted. The mail is generated on the core network device 4 in the above example. Alternatively, the billing device 5 may generate a mail including at least the billing amount.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A terminal configured to perform communications using a base station, comprising:
   a communication device configured to acquire temporary billing information stored on an external storage device via a radio communication link with the external storage device, the temporary billing information being configured to be used for billing relating to the communications by the terminal using the base station; and
   a controller configured to perform a transmission operation to transmit the temporary billing information acquired from the external storage device to a billing device over a network, the billing device being connected to the base station via the network and configured to store original billing information for use in billing relating to the communications that the terminal performs using the base station, wherein the billing device is configured to temporarily switch from the original billing information to the temporary billing information when the temporary billing information is received so as to bill the communications by the terminal via the base station using the temporary billing information.

2. The terminal according to claim 1, wherein the controller is further configured to perform the transmission operation to transmit the temporary billing information via a signal configured to establish the communications by the terminal using the base station if the terminal does not perform the communications using the base station.

3. The terminal according to claim 1, wherein the controller is further configured to perform the transmission operation to transmit information for the billing device to switch from the temporary billing information to the original billing information when the radio communication link with the external storage device is disconnected during a switching operation of the billing device to the temporary billing information.

4. The terminal according to claim 3, wherein the controller is further configured to perform the transmission operation to transmit a signal configured to disconnect the communications by the terminal using the base station when the radio communication link with the external storage device is disconnected with the terminal performing the communications using the base station.

5. The terminal according to claim 4, further comprising:
a display device configured to display a screen that prompts an input of a disconnection permission to disconnect the communication by the terminal using the base station when the radio communication link with the external storage device is disconnected with the terminal performing the communication using the base station, and
an input device configured to receive the input of the disconnection permission,
wherein the controller is further configured to perform the transmission operation to transmit a signal to disconnect the communications communication using the base station if the input device has input the disconnection permission.

6. The terminal according to claim 3, wherein the controller is further configured to perform the transmission operation to transmit an electronic mail including the information, and
wherein the electronic mail comprises, as a destination address, a particular address that triggers an operation for a mail server having received the electronic mail to transfer the information included in the electronic mail to the billing device via the network.

7. The terminal according to claim 1, wherein the controller is further configured to perform the transmission operation to transmit information for the billing device to switch from the temporary billing information to the original billing information if the communications by the terminal using the base station is disconnected with the terminal being in radio communication with the external storage device.

8. The terminal according to claim 1, wherein the controller is further configured to generate an electronic mail including the billing information and perform the transmission operation to transmit the electronic mail if the temporary billing information is acquired from the external storage device with the terminal performing the communications using the base station, and wherein the electronic mail comprises, as a destination address, a particular address that triggers an operation for a mail server having received the electronic mail to transfer the information included in the electronic mail to the billing device via the network.

9. The terminal according to claim 1, wherein the controller is configured to perform an authentication operation using authentication information received from the base station, subsequent to transmitting the temporary billing information, and perform the transmission operation to transmit information for the billing device to switch from the temporary billing information to the original billing information if the authentication operation is unsuccessful.

10. The terminal according to claim 1, wherein the controller is configured to perform the transmission operation to transmit authentication information of the temporary billing information together with the temporary billing information to the base station, receive information indicating a success if an authentication operation using the authentication information is successful on the network, and receive a signal indicating a refusal of an establishment of the communications if the authentication operation is unsuccessful.

11. The terminal according to claims 1, wherein the controller is further configured to transmit settlement information including the temporary billing information to a settlement device connected to the base station via the network if a settlement of online shopping is to be performed on the communications using the base station after the billing device switches to the temporary billing information.

12. The terminal according to claim 1, wherein the external storage device comprises a card or a device each including an integrated circuit chip capable of communicating with the terminal in accordance with one or more near field communication standards.

13. The terminal according to claim 1, wherein the external storage device is maintained by a person other than an account holder of the terminal.

14. The terminal according to claim 1, wherein the temporary billing information stored on the external storage device comprises a card number and authentication information associated with the card number.

15. A mobile communication system comprising:
a base station configured to that receive from a terminal, temporary billing information that the terminal has acquired via a radio communication link with an external storage device, the temporary billing information being configured to be used for billing relating to communications by the terminal using the base station;
a device coupled to the base station and configured to perform an operation for the terminal to establish the communications communication using the base station; and
a billing device, including:
a storage device configured to store original billing information for use in billing relating to the communications of the terminal using the base station,
a communication device configured to receive the temporary billing information from the device via a network, and
a controller configured to switch temporarily from the original billing information to the temporary billing information received by the communication device so as to bill the communications by the terminal via the base station using the temporary billing information.

16. The mobile communication system according to claim 15, wherein the device is further configured to receive the temporary billing information included in a signal for the terminal to establish the communications using the base station and transfer the signal to the billing device.

17. The mobile communication system according to claim 15,
wherein upon receiving information indicating a disconnection of a radio communication link between the terminal and the external storage device in a state that the billing device is enabled to perform a billing operation using the temporary billing information, the device is configured to transfer the information to the billing device, and
wherein the billing device is configured to switch from the temporary billing information to the original billing information in accordance with the information.

18. The mobile communication system according to claim 17,
wherein the device is configured to perform a disconnection operation on the communications if the information indicating the disconnection of the radio communication link between the terminal and the external storage device is received from the terminal performing the communications using the base station.

19. The mobile communication system according to claim 15,
wherein upon receiving from the terminal a signal configured to disconnect the communications by the terminal using the base station, the device is further configured to transmit, to the billing device, information for the billing device to switch from the temporary billing information to the original billing information.

20. The mobile communication system according to claim 15,
wherein the device is further configured to transmit authentication information of the temporary billing information to the terminal, and transfer, to the billing device, information that is configured to switch from the temporary billing information to the original billing information and is received from the terminal if authentication using the authentication information is unsuccessful.

21. The mobile communication system according to claim 15,
wherein the device is further configured to transfer the temporary billing information received from the terminal and authentication information of the temporary billing information to the billing device or an authentication device that performs an authentication operation, receive a result of the authentication operation using the authentication information from the billing device or the authentication device, transmit, to the terminal, information indicating an authentication success if the result indicates the authentication success, and transmit, to the terminal, a signal indicating a refusal of an establishment of the communications of the terminal using the base station if the result indicates an unsuccessful authentication result.

22. The mobile communication system according to claim 15,
wherein the device is further configured to transfer settlement information including the temporary billing information to a settlement device connected thereto via the network if the terminal is to perform a settlement of online shopping on the communications using the base station in a state that the billing device is enabled to perform a billing operation in accordance with the temporary billing information.

23. The mobile communication system according to claim 15,
wherein if the billing device switches from the temporary billing information to the original billing information, a fee billed based on the temporary billing information is transmitted to a terminal different from the terminal associated with the external storage device.

* * * * *